(12) United States Patent
Radakovic et al.

(10) Patent No.: US 9,163,752 B2
(45) Date of Patent: Oct. 20, 2015

(54) MOUNTING DEVICE FOR MOUNTING A CABLE OR A LINE ON A STRUCTURAL COMPONENT OF AN AIRCRAFT OR SPACECRAFT, AND AIRCRAFT OR SPACECRAFT

(71) Applicant: Airbus Operations GmbH, Hamburg (DE)

(72) Inventors: Branislav Radakovic, Hamburg (DE); Jovan Ulbrich-Gasparevic, Pinneberg (DE)

(73) Assignee: Airbus Operations GmbH, Hamburg (DE)

( * ) Notice: Subject to any disclaimer, the term of this patent is extended or adjusted under 35 U.S.C. 154(b) by 35 days.

(21) Appl. No.: 13/666,290

(22) Filed: Nov. 1, 2012

(65) Prior Publication Data

US 2013/0119209 A1    May 16, 2013

Related U.S. Application Data

(60) Provisional application No. 61/555,962, filed on Nov. 4, 2011.

(30) Foreign Application Priority Data

Nov. 4, 2011 (DE) .......................... 10 2011 085 793

(51) Int. Cl.
*F16L 3/08* (2006.01)
*F16L 3/015* (2006.01)
*H02G 3/30* (2006.01)

(52) U.S. Cl.
CPC . *F16L 3/015* (2013.01); *H02G 3/30* (2013.01)

(58) Field of Classification Search
USPC ........... 248/70, 73, 74.1, 74.2, 74.4, 74.5, 81, 248/91, 92, 288.31, 288.51, 554, 55, 27.3, 248/49, 53, 57, 62, 65, 68.1, 75, 79, 200, 248/220.21; 24/16 R; 361/825
See application file for complete search history.

(56) References Cited

U.S. PATENT DOCUMENTS 3,843,083 A * 10/1974 Angibaud ................ 248/229.14
3,853,148 A * 12/1974 De Vincent et al. .......... 138/110
(Continued)

FOREIGN PATENT DOCUMENTS

FR    2918724      1/2009
WO   2010084279    7/2010

OTHER PUBLICATIONS

German Examination Report, Oct. 8, 2012.

*Primary Examiner* — Monica Millner
(74) *Attorney, Agent, or Firm* — Greer, Burns & Crain, Ltd.

(57) ABSTRACT

A mounting device for mounting a cable or a line on a structural component of an aircraft or spacecraft. The mounting device comprises at least two parts, one of these parts being configured as an attachment part and being provided to be attached to the structural component. The other part is configured as a receiving part and is provided to receive a portion of the cable or of the line. Both parts can be coupled together by means of at least a first ball-and-socket joint. This coupling is configured such that the two parts can be brought into a plurality of spatial positions relative to one another. Also provided is an aircraft or spacecraft, in particular an aircraft, which has a structural component and a cable or a line which is mounted on the structural component by a mounting device of this type.

18 Claims, 18 Drawing Sheets

(56) References Cited

U.S. PATENT DOCUMENTS

| | | | |
|---|---|---|---|
| 5,106,177 A * | 4/1992 | Dolasia | 359/876 |
| 5,251,859 A * | 10/1993 | Cyrell et al. | 248/288.51 |
| 5,441,225 A * | 8/1995 | Hall | 248/231.61 |
| 5,921,694 A * | 7/1999 | Herbermann | 403/56 |
| 6,138,970 A | 10/2000 | Sohrt et al. | |
| 6,830,075 B1 * | 12/2004 | McKinney et al. | 138/106 |
| 6,830,225 B2 * | 12/2004 | Kato | 248/49 |
| 7,290,739 B2 * | 11/2007 | Zeuner et al. | 248/68.1 |
| 7,784,743 B2 * | 8/2010 | Zeuner et al. | 248/63 |
| 8,240,620 B2 * | 8/2012 | Walter | 248/68.1 |
| 8,242,367 B2 * | 8/2012 | Guthke et al. | 174/72 A |
| 8,534,614 B2 * | 9/2013 | Guthke et al. | 248/74.1 |
| 2001/0020668 A1 * | 9/2001 | Thomas et al. | 248/309.3 |
| 2002/0166935 A1 * | 11/2002 | Carnevali | 248/276.1 |
| 2005/0151040 A1 * | 7/2005 | Hsu | 248/214 |
| 2007/0102603 A1 * | 5/2007 | Newell | 248/219.2 |
| 2008/0023607 A1 * | 1/2008 | Barker | 248/288.51 |
| 2009/0026327 A1 * | 1/2009 | Zeuner et al. | 248/72 |
| 2009/0101787 A1 * | 4/2009 | Dierberger | 248/554 |
| 2010/0084518 A1 * | 4/2010 | Davis et al. | 248/68.1 |
| 2011/0233334 A1 * | 9/2011 | Stephan | 244/119 |
| 2012/0037756 A1 * | 2/2012 | Guthke et al. | 244/131 |
| 2013/0068900 A1 * | 3/2013 | Heath | 248/70 |

* cited by examiner

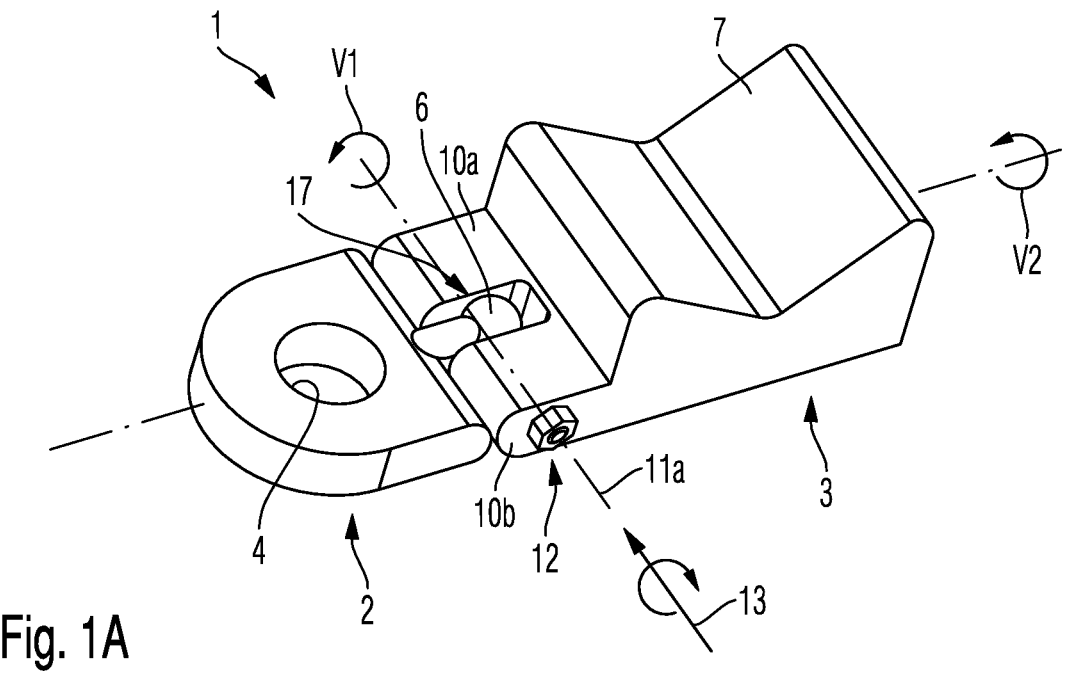
Fig. 1A
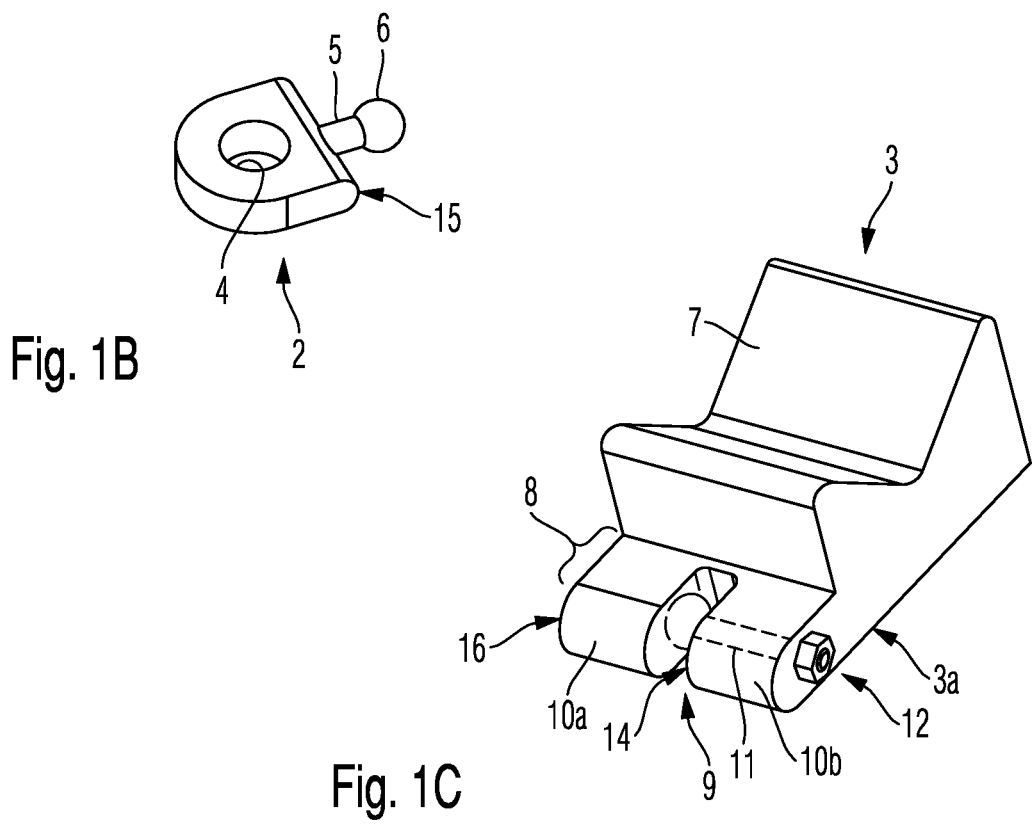
Fig. 1B
Fig. 1C

MOUNTING DEVICE FOR MOUNTING A CABLE OR A LINE ON A STRUCTURAL COMPONENT OF AN AIRCRAFT OR SPACECRAFT, AND AIRCRAFT OR SPACECRAFT

CROSS-REFERENCES TO RELATED APPLICATIONS

This application claims benefit of the U.S. Provisional Application No. 61/555,962, filed Nov. 4, 2011, and of the German patent application No. 10 2011 085 793.1, filed Nov. 4, 2011, the entire disclosures of which are incorporated herein by way of reference.

FIELD OF THE INVENTION

The present invention relates to the mounting of lines or cables on structural components of aircraft or spacecraft and relates to a corresponding mounting device and to an aircraft or spacecraft which is fitted with a device of this type.

Although the invention can be used for attaching and mounting a wide variety of lines and cables in various types of aircraft and spacecraft, the invention and the problem it addresses will be described below in detail on the basis of an example of laying an electric cable in a modern commercial aircraft.

BACKGROUND OF THE INVENTION

In present-day passenger aircraft, many electrical lines have to be laid inside the fuselage to connect numerous electrical and electronic components. For this purpose, the electrical lines or cables are guided along structural components of the aircraft, for example, and are mounted on the structural components by cable mounts at suitable intervals.

Due to the relatively complicated shapes of the structural components of an aircraft and also because it is necessary to lay electric cables of this type along the structural components, to guide them through passage openings in these structural components and/or to let cables of this type intersect one another, nowadays a large number of differently configured cable mounts is typically required for laying the individual cables or cable looms inside a commercial aircraft. For storage and production planning, high costs can be incurred due to the large number of different parts in aircraft production.

DE 10 2004 011 182 A1 and U.S. Pat. No. 7,290,739 B2 describe a clamp mounting for electric line bundles, lines or pipes in aircraft which can be used due to a wedge construction on supports, for example on crossbars, with webs of a differing thickness.

Although the flexibility during use of a cable mount of this type could be improved with the wedge construction known from the prior art, there is still a need for a cable mount which can be adapted even more effectively to the requirements of the installation surroundings. It would be desirable if as few different types of mount as possible were necessary during the laying of cables of this type inside the fuselage. Furthermore, it would be useful in some situations to be able to subsequently change an adaptation of this type which had been carried out at one time, if it was required.

SUMMARY OF THE INVENTION

According to the invention, a mounting device for mounting a cable or a line on a structural component of an aircraft or spacecraft is provided which comprises at least two parts. One of the at least two parts is configured as an attachment part and is provided to be attached to the structural component. The other of the two parts is configured as a receiving part which is provided to receive a portion of the cable or line. According to the invention, the two parts can be coupled by at least a first ball-and-socket joint such that the two parts can be brought into a plurality of spatial positions relative to one another.

The invention also proposes an aircraft or spacecraft, in particular an aircraft, which has a structural component on which a cable or a line is mounted by means of a mounting device of this type.

The fundamental idea of the present invention is the coupling of the attachment part with the receiving part by means of a ball-and-socket joint. In this manner, depending on how the cable or line is to be guided with respect to the structural component, for example parallel to the surface thereof, at an angle thereto or through a gap or opening in the structural component, the receiving part can be suitably adjusted with respect to the attachment part. Therefore, the mounting device according to the invention can be used in the most diverse installation situations inside an aircraft, particularly in a fuselage. For cable laying situations in which previously a large number of very differently configured mounting devices was required, now all that is needed is the widely adaptable mounting device according to the invention. In this way, the large number of different parts can be significantly decreased and the expenditure associated therewith can be reduced.

Advantageous configurations and developments of the invention are provided in the further subordinate claims and in the description with reference to the figures of the drawings.

According to a development, the coupling of the two parts by means of the first ball-and-socket joint is configured to be releasable to replace one of the two parts. In particular, the releasable coupling of the two parts in this development allows the part configured as a receiving part to be replaced. In an advantageous way, this makes it possible to provide a particular selection of different receiving parts which are used, for example, for receiving cables or lines of different diameters, and of which a selected receiving part can be coupled releasably with the attachment part by the first ball-and-socket joint. This further enhances the flexibility during the use of the mounting device according to the invention. Even if the attachment part is already attached to a structural component, and it is found that the receiving part coupled with the attachment part does not fit in the given installation situation, it is still possible to replace the receiving part by releasing the coupling of the two parts.

In one configuration, the two parts of the mounting device can be locked relative to one another in one or more of the plurality of spatial positions. This configuration makes it possible to prevent the position of the mounted cable or line from changing in an undesirable manner, for example due to vibrations, jolts or the like during flight operation.

In a preferred configuration, a first part of the two parts of the mounting device is configured with an extension. The extension has an end portion which is configured as a ball joint head. Furthermore, a second part of the two parts of the mounting device has a slot-like recess in which the ball joint head can be received at least in portions such that the ball joint head can be rotated in the recess. In this way, the ball joint head, in cooperation with the recess, can form the first ball-and-socket joint. An arrangement of this type makes it possible for the second of the two parts, provided with the slot-like recess, to rotate or swivel with respect to the first part within a large solid angle range. The slot-like recess is preferably configured with respect to the dimensions of the ball joint head and of the extension such that the ball joint head is received in the recess at least in portions in a securely rotatable manner without being displaced in the recess without a particular expenditure of force, and such that at the same time, the non-spherical part of the extension can move substantially freely through the slot when the second part is swiveled with respect to the first part about an axis extending through the ball joint head.

In a development, the slot-like recess can widen outwards. This measure can make it easier for a fitter to insert the ball joint head into the recess, particularly in the case of a releasable coupling of the parts of the mounting device.

In a development, the ball joint head is provided with one or more passage openings. In this case, the second part of the mounting device is also provided with at least one passage opening which extends from an outer side of the second part to a surface of the recess facing the ball joint head received in the recess. Furthermore, in this development, a securing part is provided which, in one or more of the plurality of spatial positions of the two parts relative to one another, can be introduced at least in portions into the passage opening in the second part and at the same time into the one passage opening or into one of the plurality of passage openings in the ball joint head. In this respect, the securing part or a portion thereof can be introduced into these passage openings such that after the securing part or the portion has been introduced, the ball joint head is locked positively with respect to the second part. As a result of this development, the position of the second part relative to the first part of the mounting device can be secured by a positive fit in a compact and space-saving manner. During use in an aircraft when the mount is repeatedly subjected to vibrations during flight operation, an accidental, automatic misadjustment of the position of the receiving part relative to the attachment part mounted on the structural component can be advantageously avoided.

In another development, the second part is provided with a passage opening which extends from an outer side of the second part to a surface of the recess facing the ball joint head received in the recess, this passage opening having an internal thread for screwing in a screw or a headless screw. The ball can be clamped in the recess as a result of screwing in the screw or headless screw which is preferably long enough such that after it has been adequately screwed into the passage opening, it emerges from the surface, facing the ball joint head, of the recess. Consequently, it is possible to clamp the second part of the mounting device relative to the first part in the desired spatial position. In this manner, the second part can be locked relative to the first part in almost any angular position in a frictionally engaging manner. As a result, the mounting device according to this development can be used in a particularly versatile manner.

According to another configuration, the mounting device has a connecting part which can be coupled with a first part of the two parts by means of the first ball-and-socket joint and can be coupled with a second part of the two parts by means of a second ball-and-socket joint.

This measure further enhances the adjustability of the mounting device, in that an offset of the first of the two parts relative to the second of the two parts is also made possible by means of the additional second ball-and-socket joint and the connecting part which connects the two parts.

In a development, the coupling of the connecting part with the first of the parts by means of the first ball-and-socket joint and the coupling of the connecting part with the second of the parts by means of the second ball-and-socket joint are furthermore configured to be releasable. In this manner, the connecting part can additionally be exchanged, if required, for example for another longer connecting part.

According to a development, each of the two parts of the mounting device can be locked relative to the connecting part in one or more of the plurality of spatial positions. Consequently, an accidental automatic change in position of the mounted line or cable can again be prevented during flight operation.

In one configuration, the connecting part has at least two end portions, each of which is configured as a ball joint head. Furthermore, in this configuration, the first part and the second part both have a slot-like recess. In this respect, one of the ball joint heads of the connecting part can be received in each of the recesses such that it can rotate in the recess. A first ball joint head, in cooperation with the recess in the first part, forms the first ball-and-socket joint, while the second ball joint head, in cooperation with the recess in the second part, forms the second ball-and-socket joint. In this way, a movability of each of the two parts with respect to the connecting part can be achieved within a wide solid angle range. In this configuration of the invention, the dimensions of the recesses in the first part and in the second part are preferably selected in respect of the dimensions of the connecting part such that the two ball joint heads are received in a securely rotatable manner in the recesses without easily slipping out of the recesses, and such that at the same time, the non-spherical part of the connecting part can pass substantially freely through the slots.

In a further configuration, each of the ball joint heads is provided with one or more passage openings. Furthermore in this respect, the first part and the second part are also each provided with at least one passage opening which extends from an outer side of the part to a surface of the recess facing the ball joint head, accommodated in the recess in the part. Furthermore, in this configuration, at least two securing parts are provided, and in one or more of the plurality of spatial positions, a first of the securing parts can be introduced at least in portions into the passage opening in the first part and simultaneously into the one passage opening or into one of the plurality of passage openings in the ball joint head accommodated in the recess in the first part, and a second of the securing parts can be introduced at least in portions into the passage opening in the second part and simultaneously into the one passage opening or into one of the plurality of passage openings in the ball joint head accommodated in the recess in the second part. In this respect, the securing parts or at least portions thereof can be introduced into the passage openings such that the connecting part is locked in a positive manner relative to the first part and relative to the second part after the introduction of the two securing parts or of the portions thereof. On the one hand, the mounting device according to this configuration has the most diverse adjusting possibilities in respect of the position of the two parts relative to one another and, on the other hand, the possibility of a compact, space-saving, positive locking of the position of both parts relative to one another, particularly during use in an aircraft when the mounting device may be subjected to impacts and vibrations during operation, is particularly advantageous.

In another configuration of the invention, the first part and the second part are each provided with at least one passage opening which extends from an outer side of the part to a surface of the recess facing the ball joint head accommodated in the recess in the part, the passage opening having an internal thread for screwing in a screw or a headless screw. In this configuration, the two ball joint heads can be clamped relative to the respective recess by respectively screwing an adequately long screw or an adequately long headless screw into the passage opening in the first part and into the passage opening in the second part. Consequently, it is possible to fix in a frictionally locking manner the first part with respect to the connecting part and the second part with respect to the connecting part in each case in almost any angular position to one another. Thus, the first part and the second part can also be locked in almost any spatial positions relative to one another. As a result, the mounting device can be used in an even more versatile manner.

According to a further development of the invention, the one passage opening or the plurality of passage openings in the ball joint head or in one or both of the two ball joint heads extends substantially through the centre of a spherical segment-shaped superficial portion of the respective ball joint head. This measure can ensure that when the ball joint head rotates in the recess, the passage opening does not move relative to this centre. This makes it easier to align the passage openings in the ball joint head and in the first and second parts for the locking procedure.

In a preferred configuration, the ball joint head or one or both of the two ball joint heads has in each case at least two passage openings which intersect one another substantially at a right angle. This makes it possible to lock the part, provided with the slot-like recess, with respect to the ball joint head accommodated therein in steps of substantially 90 degrees, which often suffices for the laying of cables or lines inside a fuselage for a large number of cable laying situations which are encountered.

In a preferred configuration, the one passage opening or the plurality of passage openings in the ball joint head or in one or both of the two ball joint heads and in the part or parts has in each case a polygonal cross-sectional shape. Furthermore, the securing part or parts also has/have in each case at least in portions a polygonal cross-sectional shape which substantially corresponds to the cross-sectional shape of the passage openings. This can also prevent the ball joint head from rotating about longitudinal axes of the passage openings and at the same time about a longitudinal axis of the securing part or of the introduced portion of the securing part due to a form locking between the securing part and the passage openings into which the securing part or a portion thereof has been introduced. This allows an even more complete and reliable positive locking of the parts of the mounting device relative to one another. The cross-sectional shape is preferably configured such that when rotated in steps about a predetermined angle, it is respectively aligned with itself. In a preferred variant, the cross-sectional shape of the passage openings and of the securing parts is cruciform in each case. In this respect, in a particularly preferred manner, the limbs of the cross can be of the same length.

In a further preferred configuration, the mounting device comprises a further part configured as a receiving part for the cable or line. The further part can be coupled with the part, configured as an attachment part, of the mounting device by means of a further first ball-and-socket joint or by means of a further connecting part as well as by a further first ball-and-socket joint and a further second ball-and-socket joint. The coupling of the further part configured as a receiving part with the part configured as an attachment part of the mounting device can be configured in accordance with one of the configurations described in detail above, it being possible for the two receiving parts to be coupled with the attachment part in the same way or in a different way. In this configuration, two cables which run parallel or at an angle to one another can advantageously be mounted on the structural component by the same attachment part, thereby making it possible to reduce weight.

According to a development of the invention, the part configured as an attachment part, the part configured as a receiving part and, if present, the connecting part are preferably respectively produced in one piece from a suitable plastics material, thereby again making it possible to reduce weight. The receiving part, the attachment part and the connecting part can be produced in an economical manner by injection moulding, for example. The securing part or securing parts is/are preferably also formed from plastics material.

If appropriate, the above configurations and developments can be combined together in any manner. Further possible configurations, developments and implementations of the invention also include combinations, not mentioned explicitly, of features of the invention described previously or in the following with respect to the embodiments. In this respect, a person skilled in the art will particularly also add individual aspects as improvements or supplements to the respective basic form of the present invention.

BRIEF DESCRIPTION OF THE DRAWINGS

In the following, the present invention will be described in more detail on the basis of the embodiments provided in the schematic figures of the drawings, in which:

FIG. 1A is a perspective view from above of a mounting device according to a first embodiment of the invention in an assembled state;

FIG. 1B shows an attachment part of the mounting device of FIG. 1A;

FIG. 1C shows a receiving part of the mounting device of FIG. 1A;

Figure 2:
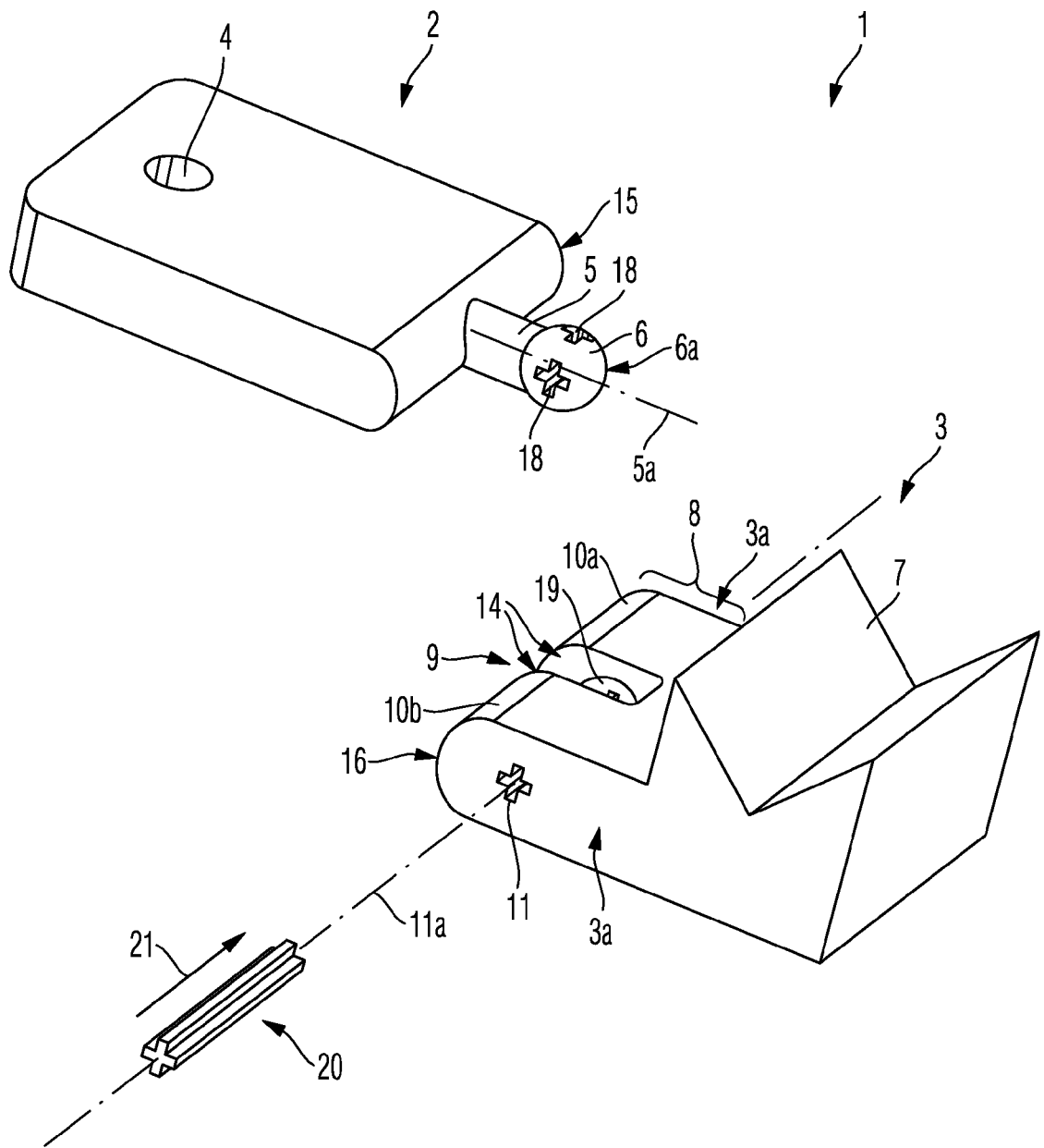
FIG. 2 is an exploded view of a mounting device according to a second embodiment of the invention.

The accompanying drawings are to provide a further understanding of the embodiments of the invention. They illustrate embodiments and, together with the description, serve to explain principles and concepts of the invention. Other embodiments and many of the mentioned advantages become obvious from viewing the drawings. The elements of the drawings are not necessarily shown true to scale relative to one another.

In the figures of the drawings, identical, functionally identical and identically acting elements, features and components are provided in each case with the same reference signs unless indicated otherwise.

DETAILED DESCRIPTION OF THE INVENTION

FIG. 1A shows a mounting device 1 according to a first embodiment. The mounting device 1 is used to mount a cable (not shown) or a line (not shown) on a structural component (also not shown) of an aircraft and spacecraft, in particular an aircraft.

The mounting device 1 of FIG. 1A has an attachment part 2 and a receiving part 3. The attachment part 2 is configured to be attached to the structural component (not shown) and, for this purpose, has an attachment opening 4 for the passage through of a screw or a rivet or another suitable attachment means. The receiving part 3 is configured to receive a portion of the cable or line. In FIG. 1A, the receiving part 3 is fitted with a V-shaped seat 7, it being possible for the cable or line to be introduced into the base of the V and to be fixed therein by a cable tie, for example.

As shown in FIG. 1B, the attachment part 2 has a bar-like extension 5 which has an end portion configured as a ball joint head 6. As shown in FIG. 1C, the receiving part 3 is provided with a plate-like portion 8 which extends away from the seat 7 and has on one side a slot-like recess 9. The recess 9 thus divides the plate-like portion 8, preferably in the centre, into two regions 10a and 10b.

A passage opening 11, indicated in dashed lines in FIG. 1C, extends through the region 10b from an outer side 3a of the receiving part 3 into the recess 9. The passage opening 11 has an internal thread such that a screw 12 can be screwed into the passage opening 11. In FIG. 1A, the axis of the passage opening 11 is denoted by reference numeral 11a, and the screwing-in movement 13 is also indicated.

In the assembled state of FIG. 1A, the ball joint head 6 has been received in the slot-like recess 9 between the regions 10a and 10b. Mutually opposite lateral surfaces 14 of the recess 9, of which only one has been provided with a reference numeral in FIG. 1C for the sake of clarity, are each preferably provided with a spherical segment-shaped depression such that the ball joint head 6 is held securely and rotatably in the recess 9 by means of these depressions. The non-spherical portion of the rod-shaped extension 5 is configured with a smaller diameter than the ball joint head 6 and can thus move freely through the outwardly open slot-like recess 9. As indicated in FIG. 1A, the receiving part 3 can perform swiveling movements V1 and V2 relative to the attachment part 2 due to the spherical shape of the ball joint head 6.

To facilitate the swiveling movement of parts 2 and 3 relative to one another and to avoid the parts jamming, the end faces 15 and 16 of the attachment part 2 and of the receiving part 3 which face one another in the assembled state of the mounting device 1 are rounded.

To attach a line or a cable to a structural component of the aircraft or spacecraft, the assembled mounting device 1 can firstly be adapted to the installation situation by adjusting the receiving part 3 with respect to the attachment part 2. For this purpose, the receiving part 3 is rotated relative the attachment part 2 by means of a first ball-and-socket joint 17 which is formed by the cooperation of the ball joint head 6 and the slot-like recess 9 and which couples parts 2 and 3 preferably in a releasable manner, and is locked in the desired position by the screw 12. In this respect, the screw 12 is long enough so that, when screwed sufficiently into the passage opening 11 in the receiving part 3 which extends through the surface 14, it projects into the recess 9 and clamps the ball joint head 6. The attachment part 2 is then attached to the structural component. Alternatively, it is also possible first of all for the attachment part 2 to be attached to the structural component and for the receiving part 3 to then be adjusted, if permitted by the installation situation.

FIG. 2 is an exploded view of a second embodiment of the invention. This embodiment is similar to the first embodiment of FIG. 1A to 1C, the differences to the first embodiment being described in the following.

The mounting device 1 according to FIG. 2 also has an attachment part 2 with a rod-like extension 5 and a ball joint head 6. The ball joint head 6 is provided with two passage openings 18 which extend fully through the ball joint head 6 and intersect one another substantially at a right angle. Furthermore, both passage openings 18 also extend substantially vertically to a longitudinal axis 5a of the extension 5 and extend through the centre of a spherical segment-shaped superficial portion 6a of the ball joint head 6.

In the second embodiment, the receiving part 3 is also provided with a passage opening 11. In the case of the second embodiment, this passage opening 11 preferably extends through both regions 10a and 10b of the plate-shaped portion 8 from outer sides 3a of the receiving part 3 to the surfaces 14 of the recess 9.

The passage openings 18 in the ball joint head 6 as well as the passage opening 11 in the receiving part 3 have a cruciform cross section, the cross sections of the passage openings 18 and 11 corresponding to one another and substantially having the same dimensions. The limbs of the cruciform cross sections are substantially of the same length.

As already stated in respect of the first embodiment, the lateral surfaces 14, facing the ball joint head 6, of the slot-like recess 9 are each provided with a spherical segment-shaped depression 19, the passage opening 11 coming to rest substantially in the centre of the depression 19.

To assemble the mounting device 1 according to the second embodiment of FIG. 2, the ball joint head 6 is inserted into the slot-like recess 9 such that it rests in the depressions 19 in the lateral surfaces 14 and is thus accommodated securely and at the same time rotatably in the slot-like recess 9. The ball joint head 6 can preferably be snapped into the depressions 19 by normal manual force. As a result, the ball joint head 6 is held in a releasable manner in the recess 9.

The receiving part 3 can now be suitably adjusted with respect to the attachment part 2 for the laying or installation situation of the cable or line. For this purpose, as already described in respect of FIG. 1A to 1C, the receiving part 3 is swiveled relative to the attachment part 2. In the second embodiment, the securing step is carried out by locking the receiving part 3 with respect to the attachment part 2 by means of a pin-shaped securing part 20. After the desired position of the receiving part 3 has been adjusted relative to the attachment part 2, the securing part 20 is pushed in the direction of arrow 21 into the passage opening 11 and into one of the passage openings 18 which aligns with the passage opening 11 in the adjusted position. In this manner, after the securing part 20 has been introduced, parts 2 and 3 are locked positively and are secured against a relative movement. The cruciform cross-sectional shape of the passage openings 11 and 18 and the matching cruciform cross-sectional shape of the securing part 20 prevent a rotation about the longitudinal axis of the securing part 20. The locking can be easily released again by removing the securing part 20 from the passage openings 11, 18 and the adjustment of parts 2, 2 relative to one another can be changed. Relative to the attachment part 2, the receiving part 3 can thus be brought into a plurality of spatial positions which are offset by 90° in each case from one another.

Figure 3:
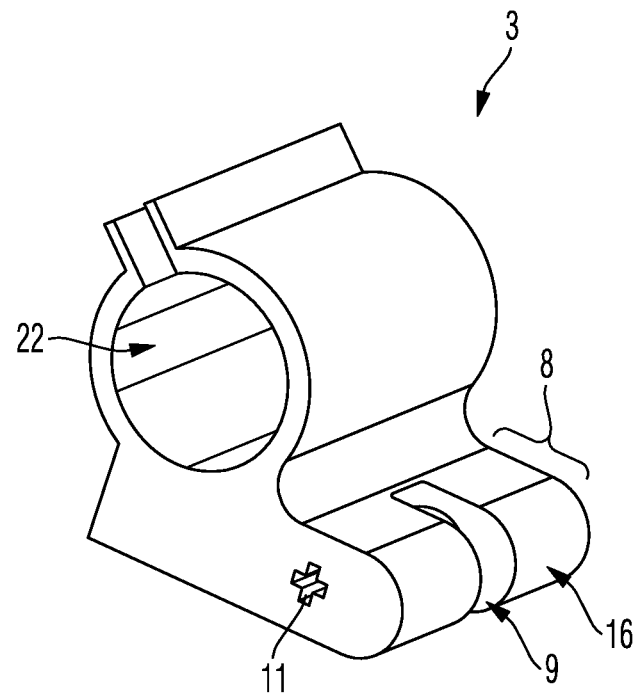
FIG. 3 shows a variant of a receiving part for the mounting device of FIG. 2.
Figure 4A:
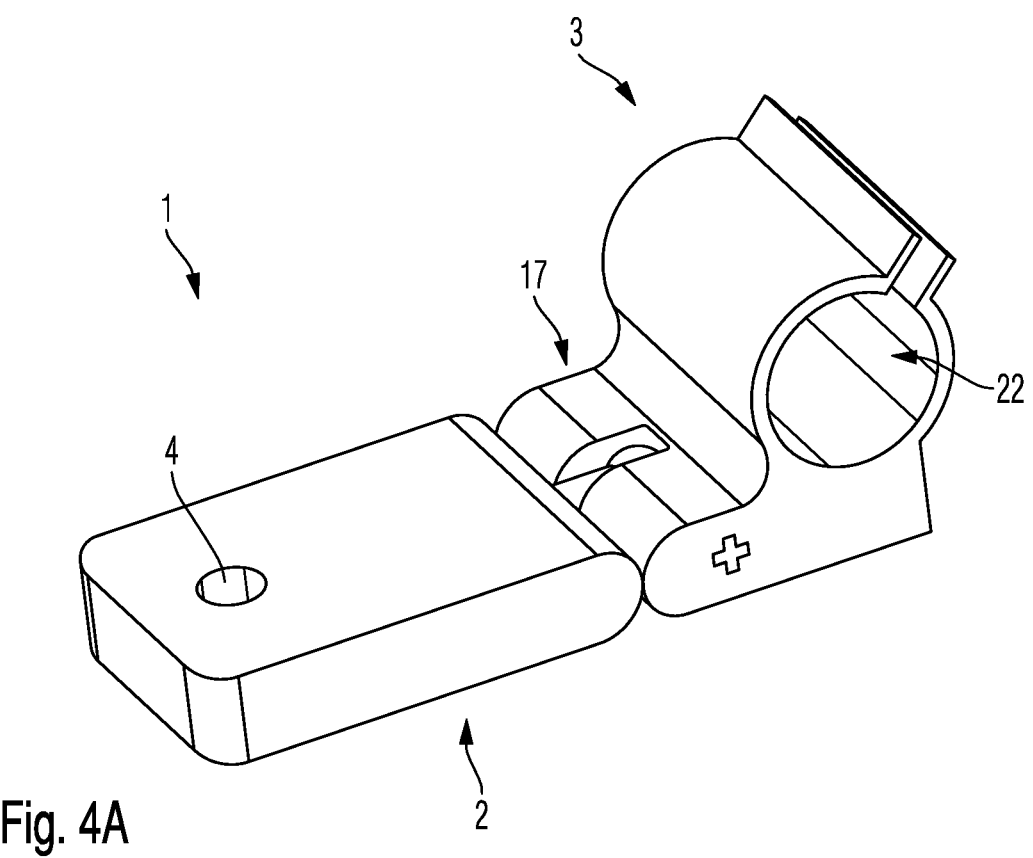
FIG. 4A shows the mounting device according to the embodiment of FIG. 2 in an assembled state, the receiving part having been replaced by the receiving part of FIG. 3.
Figure 4B:
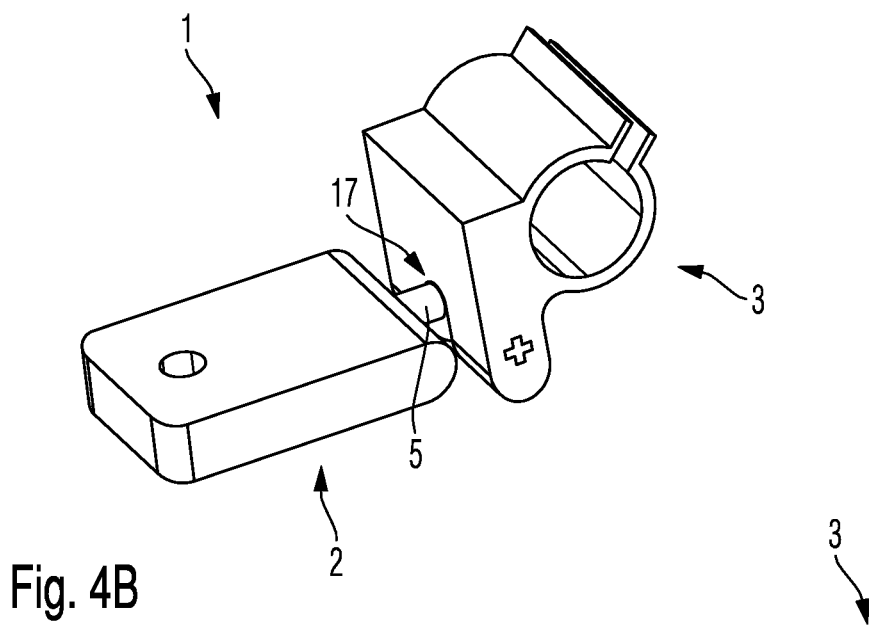
FIG. 4B shows a possible state of use of the mounting device of FIG. 4A.
Figure 5A:
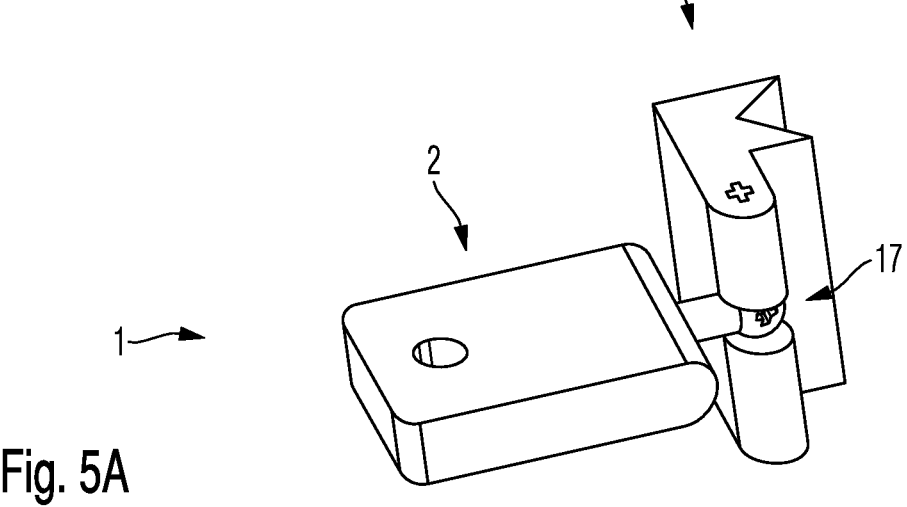
FIG. 5A shows a possible state of use of the mounting device of FIG. 2.
Figure 5B:
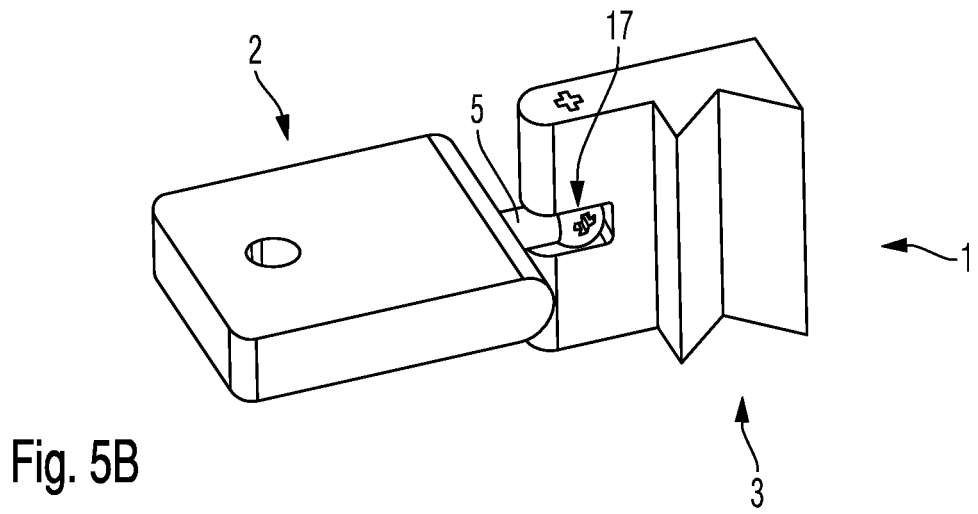

FIG. 3 shows a receiving part 3 which differs from the receiving part 3 shown in FIG. 2 in that instead of a V-shaped seat 7, a clamping collar seat 22 is provided for the cable or the line. As shown in FIG. 4A, the receiving part 3, as shown in FIG. 2, can be replaced by the receiving part 3 with the clamping collar seat 22 of FIG. 3. After the attachment part 2 has been attached to an aircraft structure, a replacement of this type is still possible, if appropriate after releasing the locking, by the releasable coupling of parts 2 and 3 by means of the first ball-and-socket joint 17. FIGS. 4B, 5A and 5B show several possibilities of adjusting the receiving part 3 with respect to the attachment part 2.

Figure 6:
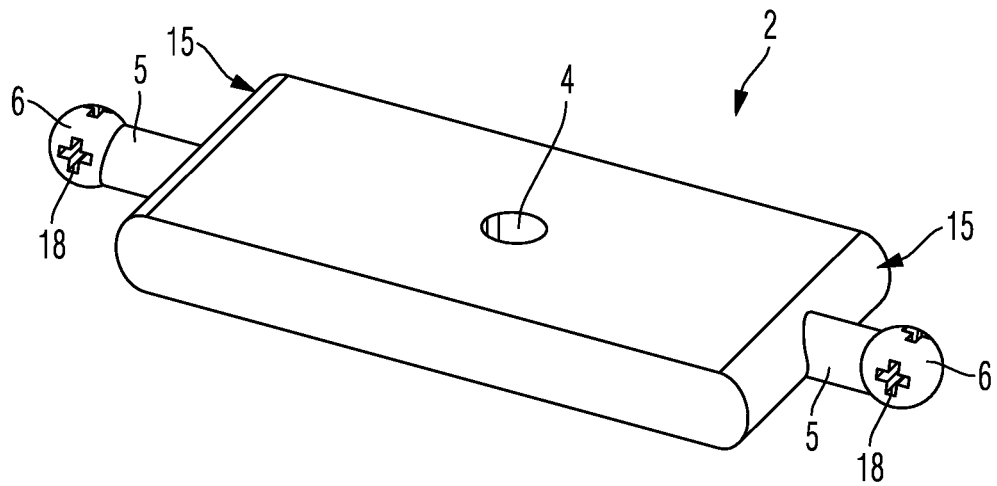
FIG. 6 shows an attachment part for a mounting device according to a third embodiment of the invention.

A third embodiment of the mounting device 1 according to the invention comprises an attachment part 2 which is provided with two bar-like extensions 5 which extend away from opposite sides of the attachment part 2, configured substantially in the manner of a plate, and which each support on the end a ball joint head 6 with passage openings 18, see FIG. 6. End faces 15, from which one of the extensions 5 respectively extends are also rounded in the third embodiment. The attachment part 2 of FIG. 6 also has an attachment opening 4 for attachment to a structural component of an aircraft or spacecraft.

In the same way as described in respect of FIG. 2, two receiving parts 3 can be coupled with the attachment part 2 of FIG. 6. In this respect, each of the ball joint heads 6 forms a first ball-and-socket joint 17 in cooperation with the slot-like recess 9 in one of the receiving parts 3.

The two receiving parts 3 can be adjusted in a varied manner with respect to the attachment part 2 by means of the ball-and-socket joints 17. Due to the omission of a separate attachment part 2 for each of the receiving parts 3, it is possible to reduce weight, which is an advantage in aircraft construction and in astronautics. FIG. 7A-D show different possibilities of adjusting the two receiving parts 3 with respect to the common attachment part 2. As illustrated in FIG. 2, each of the receiving parts 3 is locked positively on the attachment part 2 by its own securing part 20.

Figure 7A:
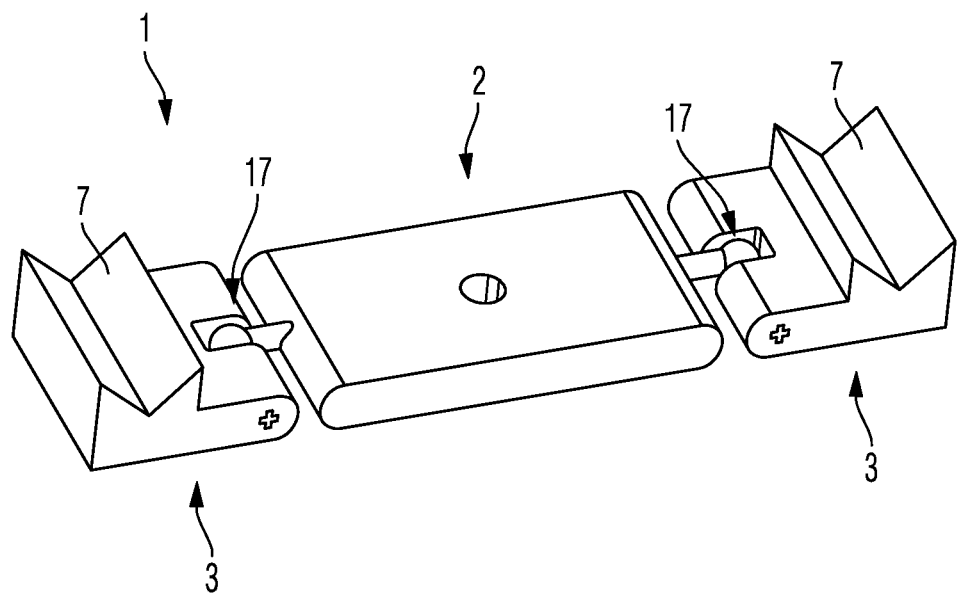
FIG. 7A shows a mounting device according to the third embodiment in an assembled state.
Figure 7B:
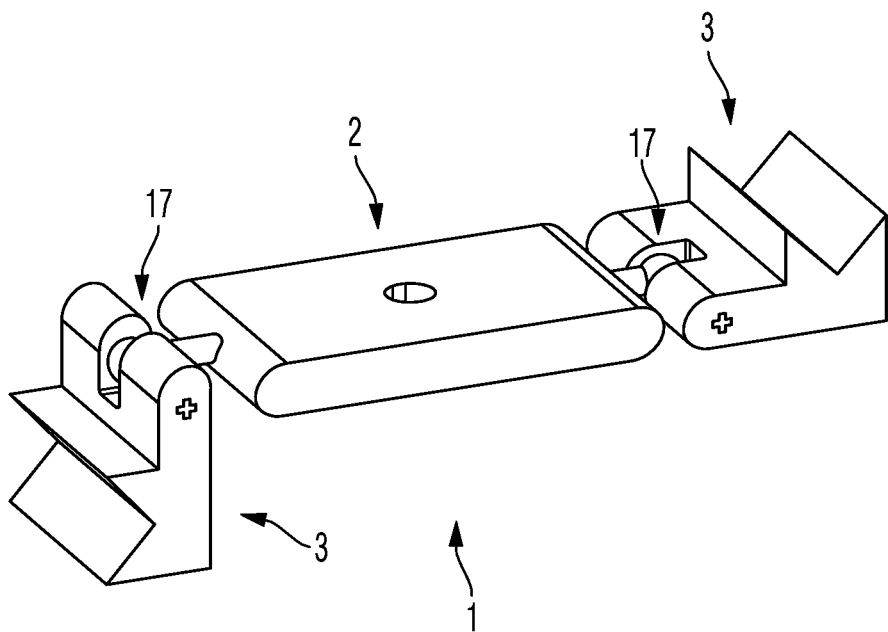
FIG. 7B shows the mounting device of FIG. 7A in a further possible state of use.
Figure 7C:
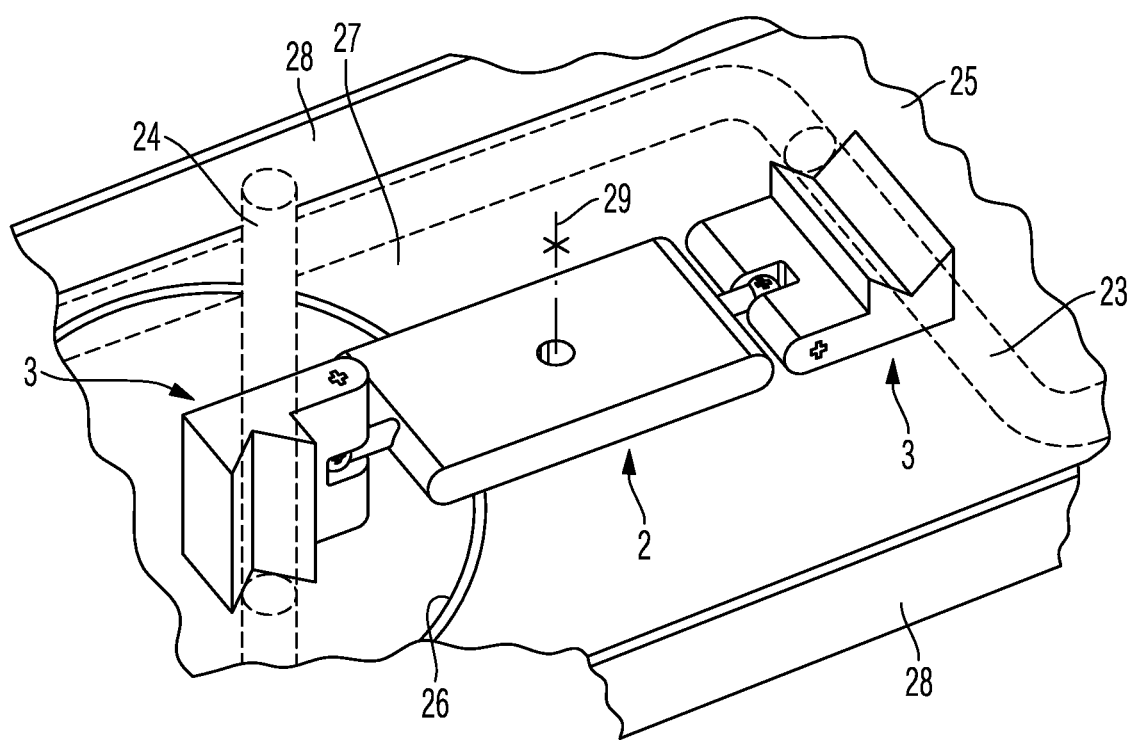
FIG. 7C shows the mounting device of FIG. 7A in a further possible state of use, a portion of a crossbar also being shown as an example of a structural component of an aircraft or spacecraft as well as two cables to be mounted thereon.
Figure 7D:
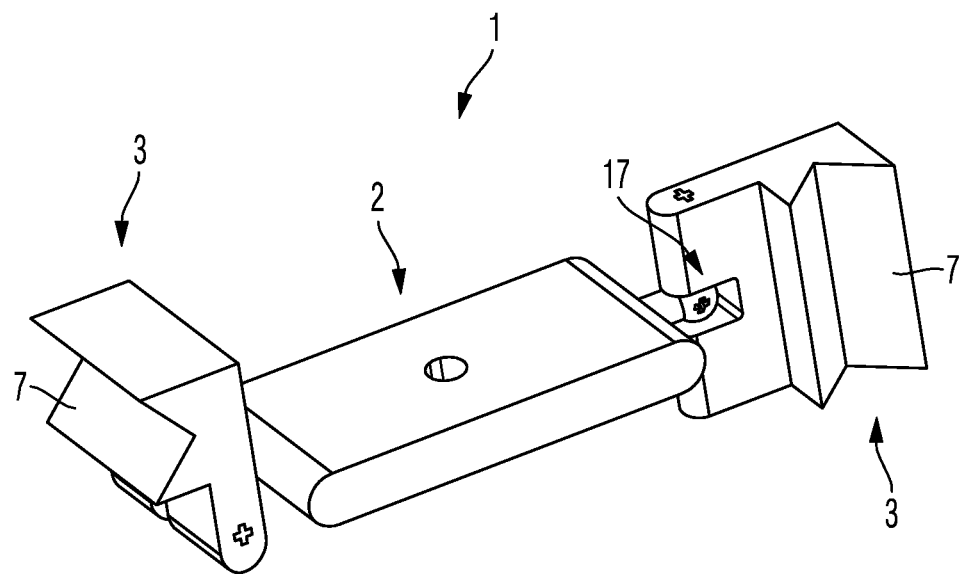
FIG. 7D shows a further possible state of use of the mounting device of FIG. 7A.

FIG. 7C illustrates the versatility of the mounting device 1 using the example of the laying of two cables 23, 24 and mounting these cables in the region of a crossbar 25, which serves as an example of a structural component of an aircraft or spacecraft, in particular of a passenger aircraft.

As FIG. 7C further shows, the crossbar 25 has a cavity 26 which can also serve to reduce weight. The cable 24 runs through the cavity 26. The cable 23 is laid along the crossbar 25 which has a web 27 and a flange 28, runs substantially parallel to the web 27 and, as shown in FIG. 7C, can be laid in a type of S-curve, for example. The mounting device 1 according to the third embodiment can advantageously be used for mounting the two cables 23, 24.

After the two receiving parts 3 have been brought into the desired position relative to the attachment part 2 and have been locked in this position by a respective securing part 20, the attachment part 2 is attached to the web 27 of the crossbar 25, for example by a screw 29.

In the example of FIG. 7C, one of the receiving parts 3 is adjusted parallel to the attachment part 2 and receives a portion of the cable 23 running parallel to the web 27, while the receiving part 3 at the other end of the attachment part 2 is rotated by 90° with respect to the first receiving part 3 and receives portions of the cable 24 which runs vertically to the cable 23.

Figure 8:
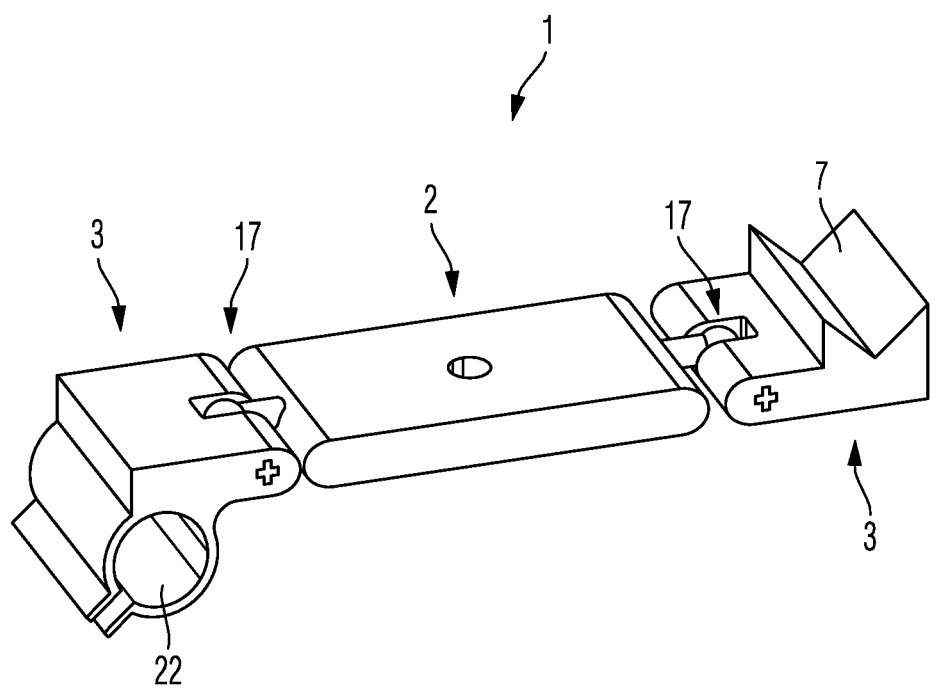
FIG. 8 shows the mounting device according to the third embodiment in a variant with two different receiving parts.

Although it is only receiving parts 3 with a V-shaped seat 7 which are shown in FIG. 7A to 7G, it is naturally also possible for receiving parts 3 with a clamping collar seat 22 to be used or, as illustrated in FIG. 8, it is also possible for two different receiving parts 3 to be coupled with the same attachment part 2 by means of the first ball-and-socket joints 17.

While the locking of the two receiving parts 3 of the mounting device 1 according to the third embodiment of the invention has been described above in a form-locking manner by means of two securing parts 20, it is also possible for the frictionally engaged locking, described with respect to FIG. 1A to 1C, using a respective screw 12 which is screwed in each case into a suitably formed passage opening 11 in each of the receiving parts 3, to be applied to the third embodiment.

Figure 9:
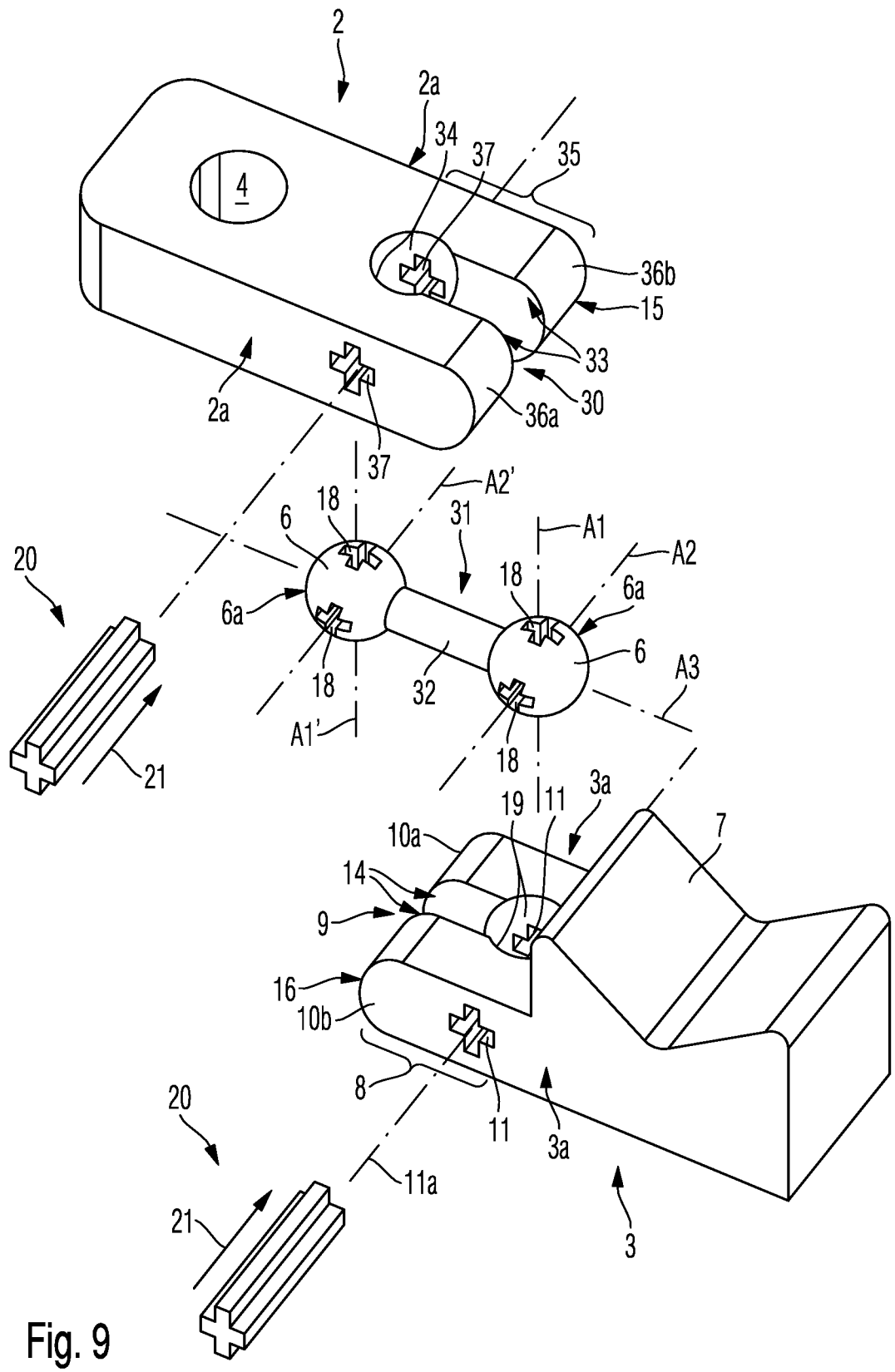
FIG. 9 is an exploded view of a mounting device according to a fourth embodiment of the invention.

FIG. 9 is an exploded view of a fourth embodiment of the mounting device 1. This mounting device 1 has a receiving part 3 which is substantially configured in the same way as the receiving part 3 of the second embodiment of FIG. 2. Furthermore, the mounting device 1 of the fourth embodiment also has an attachment part 2 which is also provided with a slot-like recess 30 similarly to the receiving part 3, unlike the embodiments described above. The slot-like recess 30 is open to a rounded end face 15 of the attachment part 2.

To couple the attachment part 2 and the receiving part 3 together, the mounting device 1 of the fourth embodiment also has a connecting part 31. In the embodiment shown in FIG. 9, the connecting part 31 is substantially dumbbellshaped, a respective ball joint head 6 being arranged at the ends of a substantially cylindrical, bar-like centre piece 32. Similarly to the description with respect to FIG. 2, each of the ball joint heads 6 is provided with two passage openings 18 which extend along two axes A1, A2 and A1', A2', said axes A1, A2 and A1', A2' being positioned substantially vertically on each other in each case. Furthermore, the axes A1, A2 and A1', A2' also extend substantially vertically in each case to a longitudinal axis A3 of the connecting part 31 which also forms the longitudinal axis of the centre piece 32.

Similarly to the slot-like recess 9 in the receiving part 3, the slot-like recess 30 in the attachment part 2 also has lateral surfaces 33 which are provided with mutually opposing spherical segment-shaped depressions 34 for receiving one of the ball joint heads 6.

In the example of FIG. 9, the slot-like recess 30 divides an end portion 35 of the attachment part 2, similarly to the case of the receiving part 3, into two regions 36a and 36b. Extending through both regions 36a and 36b is a passage opening 37 which extends from outer sides 2a of the attachment part 2 to the slot-like recess 30 and exits substantially in the centres of the depressions 34. The cross section of the passage opening 37 is cruciform, like the cross sections of the passage openings 18 in the ball joint heads 6 and of the passage opening 11 in the receiving part 3.

During assembly of the mounting device 1 according to the fourth embodiment of FIG. 9, one of the ball joint heads 6 is received rotatably in the slot-like recess 30 in the attachment part 2 and comes to rest in portions inside the mutually opposite depressions 34, while the second ball joint head 6 of the connecting part 31 is received rotatably in the slot-like recess 9 in the receiving part 3 and comes to rest in portions in the mutually opposite depressions 19, provided in the lateral surfaces 14. In this embodiment as well, the ball joint heads 6 are preferably inserted releasably by manual force into the recesses 9 and 30 and into the depressions 19 and 34.

To lock the position of the attachment part 2 relative to the connecting part 31 and to lock the position of the receiving part 3 relative to the connecting part 31, securing parts 20 are again provided which, as in the example of FIG. 2, are configured in the manner of a pin with a cruciform cross section and are introduced in direction 21 through the passage openings 37 and 11 into one of the passage openings 18 in the respective ball joint head 6.

Figure 10A:
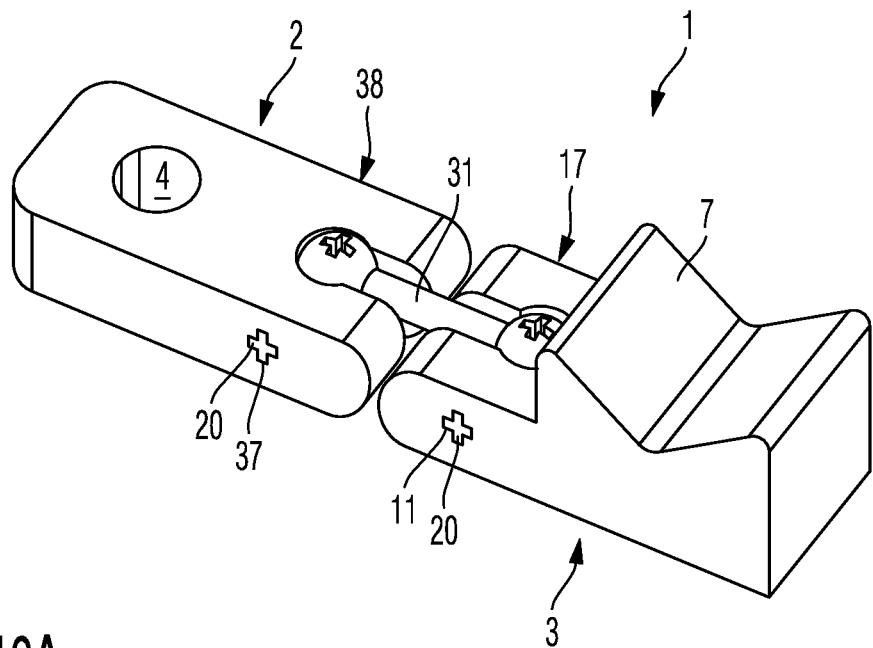
FIG. 10A is a perspective view from above of the mounting device of FIG. 9 in an assembled state.
Figure 10B:
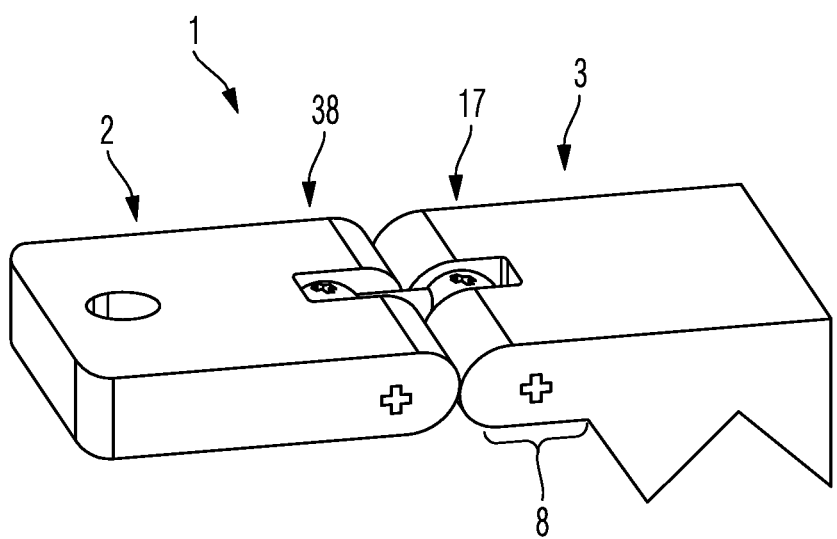
FIG. 10B is a perspective view from below of the mounting device of FIG. 9 in an assembled state.

FIG. 10A is a perspective view from above of the mounting device 1 according to the fourth embodiment in an assembled state, while FIG. 10B shows this same mounting device 1 in a perspective view from below. In the state of FIG. 10A, 10B, the attachment part 2, the connecting part 31 and the receiving part 3 come to be located substantially in one plane. The two securing parts 20 have been fully introduced into the passage openings 37 and 11 and into one of the passage openings 18 in each ball joint head 6, the securing parts 20 having been pressed into the passage openings 11, 18, 37 with some force for this purpose so that they are held securely pressed therein. Furthermore, as shown by FIG. 10A, one of the ball joint heads 6 of the connecting part 31 forms, in cooperation with the slot-like recess 9, a first ball-and-socket joint 17, while the second ball joint head 6 of the connecting part 31 forms, in cooperation with the slot-like recess 30 in the attachment part 2, a second ball-and-socket joint 38. The two ball-and-socket joints 17 and 38 couple the attachment part 2 and the receiving part 3 via the connecting part 31 such that the parts 2, 3 can be brought into a plurality of spatial positions relative to one another. In FIG. 10A, the selected position has already been secured positively by the introduction of the securing parts 20, in other words, the two parts 2, 3 are locked relative to one another and to the connecting part 31.

While FIGS. 9, 10A and 10B show a receiving part 3 with a V-shaped seat 7, a clamping collar seat 22, as shown in FIG. 3, can be provided as an alternative.

Figure 11:
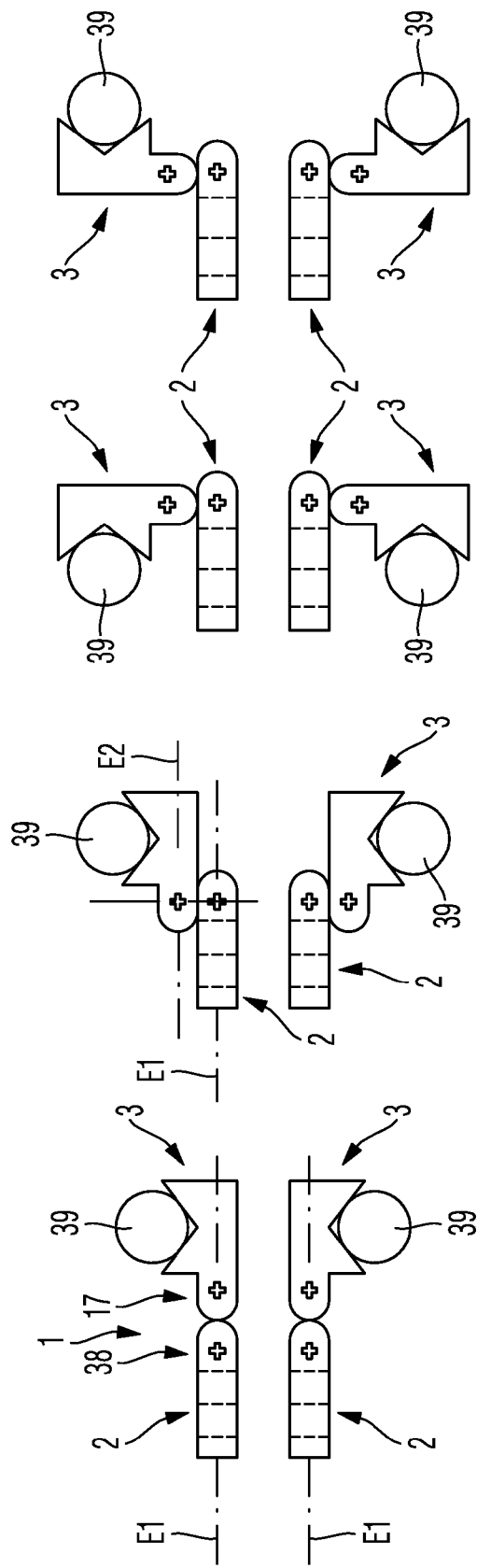
FIG. 11 shows a number of possible states of use of the mounting device according to the fourth embodiment.
Figure 11:
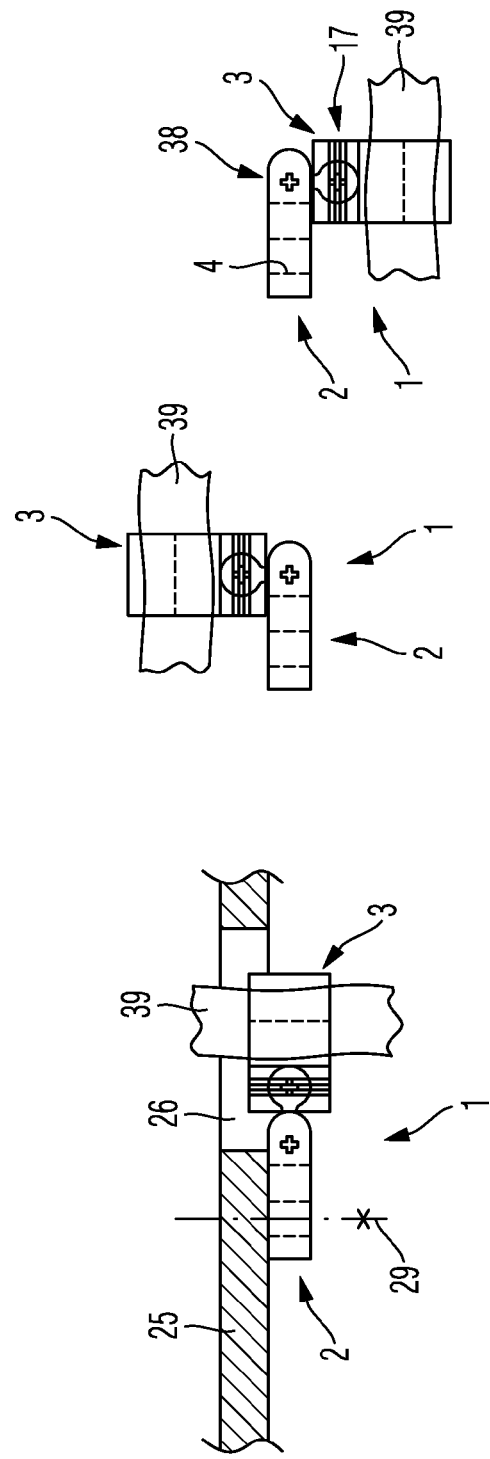
Figure 12A:
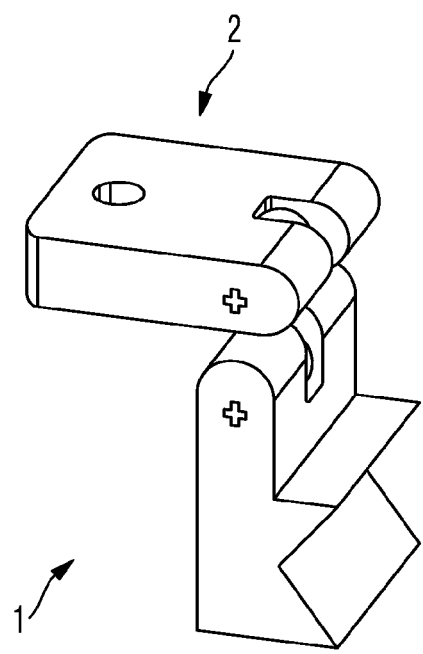
FIG. 12A-G are perspective views of some possible states of use of the mounting device according to the fourth embodiment.
Figure 12B:
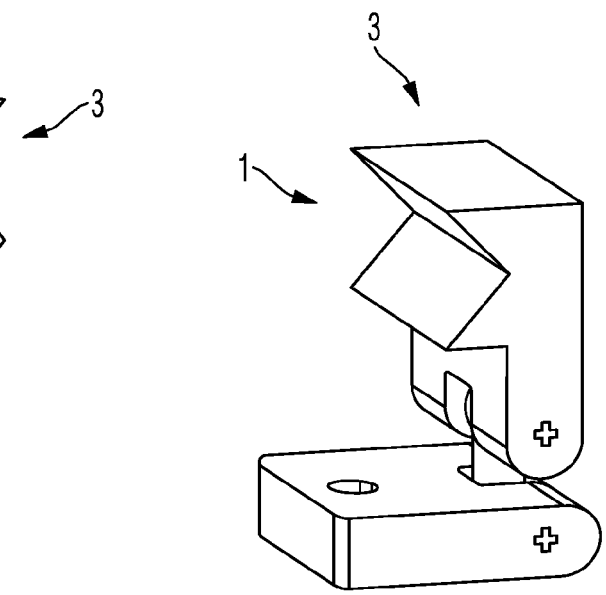
Figure 12C:
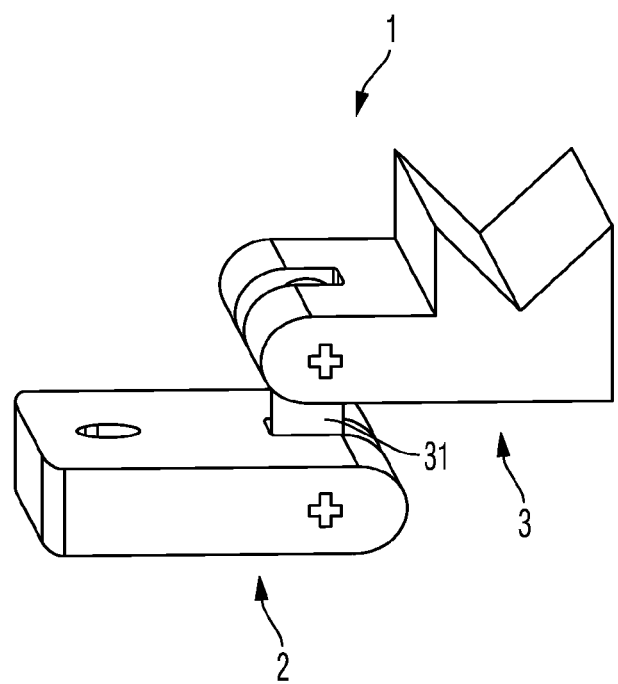
Figure 12D:
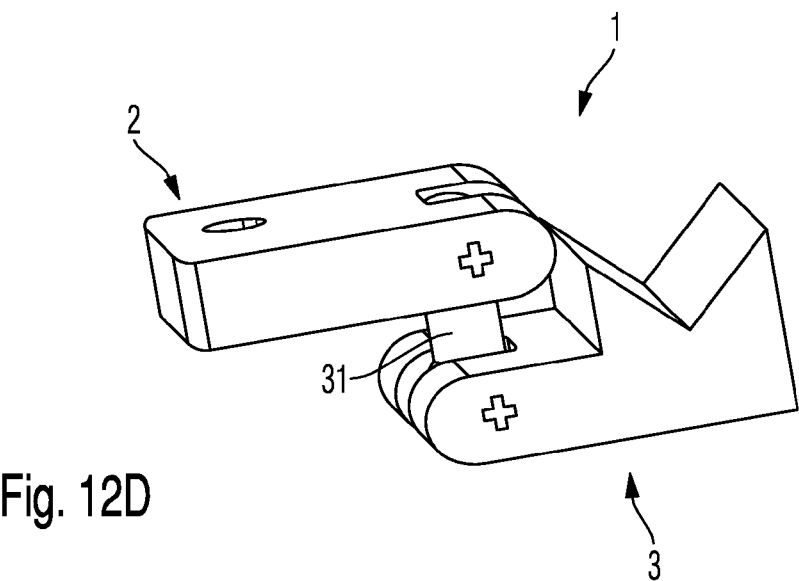
Figure 12E:
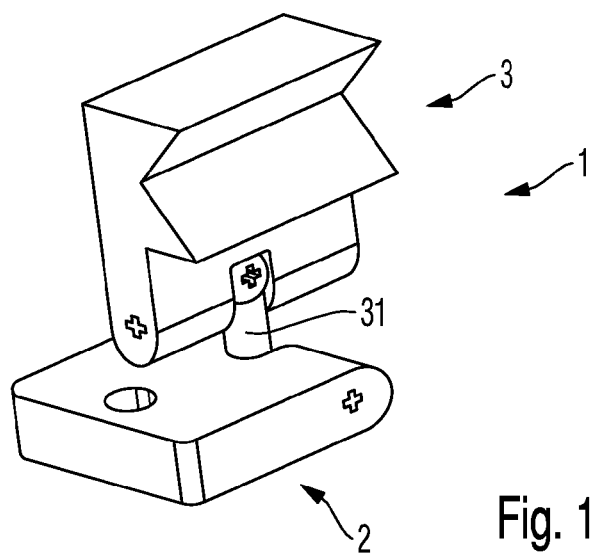
Figure 12F:
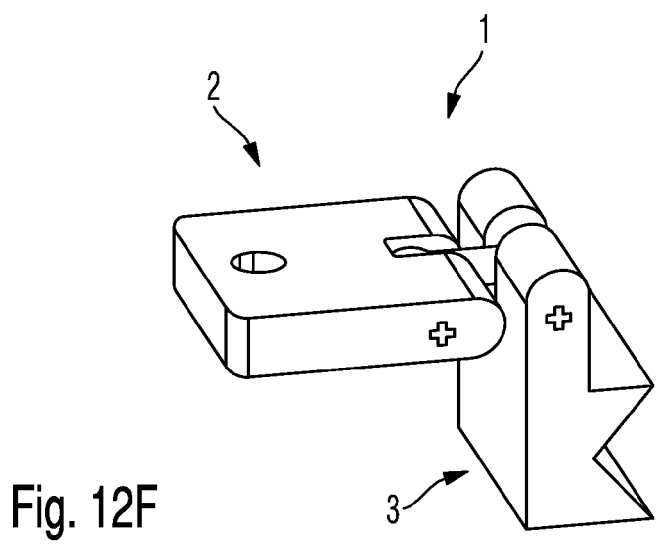
Figure 12G:
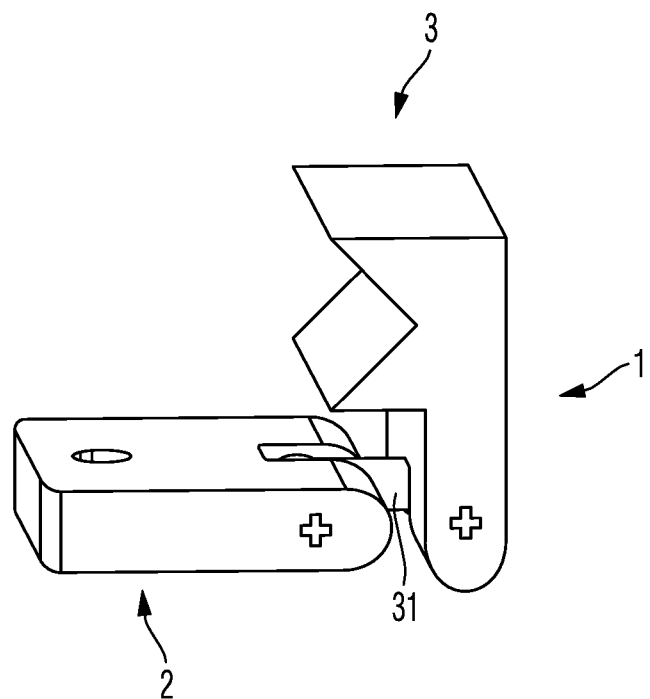

FIG. 11 shows side views and plan views of the mounting device 1 according to the fourth embodiment of the invention in several possible states of use. Due to the provision of two ball-and-socket joints 17 and 38, it is possible in the fourth embodiment to not only swivel the receiving part 3 with respect to the attachment part 2, but also to move the receiving part 3 relative to the attachment part 2 by a specific distance. In other words, as shown in FIG. 11, the substantially plate-like attachment part 2 and the plate-like portion 8 of the receiving part 3 can come to be located in one plane E1, or alternatively, they can be arranged, for example, in two substantially parallel planes E1 and E2.

Furthermore, in FIG. 11, the mounting of a cable 39, guided through a cavity 26 in a crossbar 25, by the mounting device 1 according to the fourth embodiment is sketched by way of example. The attachment part 2 is again attached to the crossbar 25 by a screw 29. However, in FIG. 11, the structural component, here for example a crossbar 25, is only shown for one of the sketched configurations.

In FIG. 12A to 12G, some of the possible states in which the mounting device 1 according to the fourth embodiment of the invention can be used, are again shown by way of example in a perspective view. In each of the states of FIG. 12A to 12G, the two parts can be locked relative to one another and relative to the connecting part 31 using two securing parts 20.

In all the illustrated embodiments, the attachment part 2, the receiving part 3 and, if present, the connecting part 31 are preferably respectively produced in one piece from a suitable plastics material, for example by injection moulding. The securing part 20 is preferably also produced from a plastics material. The screw 12 of the first embodiment can be produced from plastics material or from metal.

It should be noted with respect to the fourth embodiment, as described above with reference to FIGS. 9 to 12G, instead of the positive locking by the securing parts 20, if required a clamping with a respective screw 12 can also be carried out, in which case the passage openings 37 and 11 in the attachment part 2 and in the receiving part 3 can appropriately be configured cylindrically and can be formed with an internal thread.

Furthermore, it is also possible to provide the attachment part 2, as shown in FIG. 9, with a further slot-like recess, for example on the side opposite the slot-like recess 30, so that it is possible here to couple a further receiving part 3 by means of a further connecting part 31 and a further first ball-and-socket joint 17 and a further second ball-and-socket joint 38.

Figure 13A:
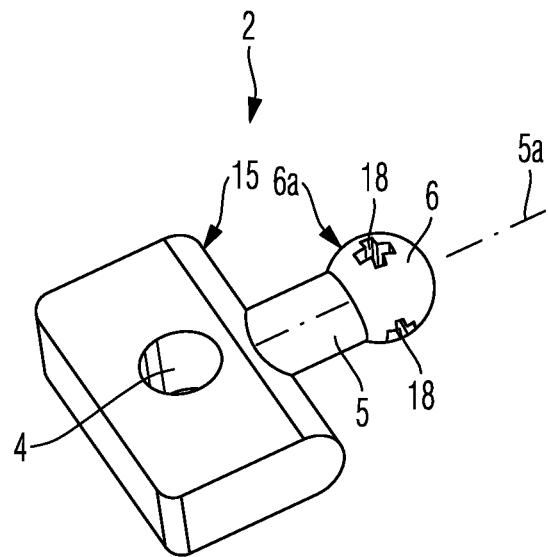
FIG. 13A shows an attachment part of a mounting device according to a fifth embodiment of the invention.

FIG. 13A to 19 illustrate a further fifth and sixth embodiment of the present invention. As shown by FIG. 13A, a mounting device 1 according to the fifth embodiment has an attachment part 2 which is substantially configured like the attachment part 2 of the second embodiment of FIG. 2. Only the dimensions of a basic body of the attachment part 2, from which the extension 5 projects are slightly altered compared to FIG. 2.

Figure 13B:
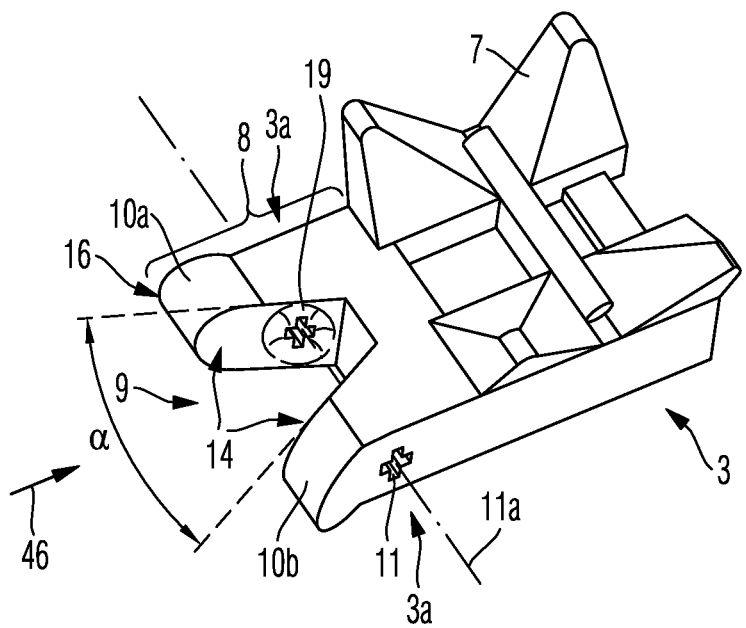
FIG. 13B shows a receiving part of the mounting device according to the fifth embodiment.
Figure 13C:
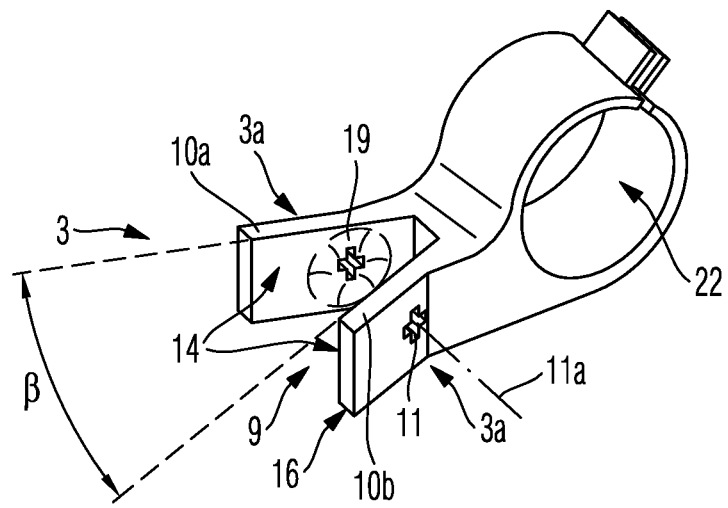
FIG. 13C shows a variant of the receiving part of the mounting device according to the fifth embodiment.

FIGS. 13B and 13C show examples of receiving parts 3 for the mounting device 1 according to the fifth embodiment. The receiving part 3 of FIG. 13B has a V-shaped seat 7 for receiving a portion of a cable (not shown), while the receiving part 3 of FIG. 13C is provided with a clamping collar seat 22. The differences compared to the receiving parts 3 shown in FIGS. 2 and 3 will be described in the following.

Like the receiving part 3 of FIG. 2, the receiving part 3 of FIG. 13B has a slot-like recess 9 which divides a plate-shaped portion 8 of the receiving part 3 into two regions 10a and 10b. Lateral surfaces 14 of the recess 9 are again provided with depressions 19 for receiving a ball joint head 6 of the attachment part 2, see FIG. 13A. However, the receiving part 3 of FIG. 13B differs from that of FIG. 2 in that the lateral surfaces 14 of the slot-like recess 9 in the example of FIG. 13B do not extend parallel to one another, but the recess 9 widens outwards, to a rounded end face 16 of the receiving part 3 and opens at an angle α. The aperture angle α makes it possible to introduce the ball joint head 6 of the attachment part 2 into the slot-like recess in the direction of arrow 46. The dimensions of the slot-like recess 9, of the depression 19 and of the ball joint head 6 are preferably selected relative to one another such that the ball joint head 6 can be snapped with normal manual force into the depressions 19 which are preferably configured in the manner of spherical segments with approximately the radius of a spherical segment-shaped superficial portion 6a of the ball joint head 6. The configuration of the slot-like recess 9 with lateral surfaces 14 extending at an angle α to one another thus makes it possible to couple together the receiving part 3 and the attachment part 2 in a releasable manner. In this way, the receiving part 3 can be replaced as required, for example by the receiving part of FIG. 13C.

The receiving part 3 of FIG. 13C also has a slot-like recess 9 with lateral surfaces 14 which open outwards at an angle β towards an end face 16 of the receiving part 3, said end face 16 extending in a substantially planar manner in the case of the receiving part 3 of FIG. 13C.

For a particularly flexible and versatile use of the mounting device 1 according to the fifth embodiment of the invention, a selection of receiving parts 3, for example, can be provided which are configured, for example as shown in FIGS. 13B and 13C. In this respect, of the receiving parts 3 according to FIGS. 13B and 13C, a plurality of sizes adapted to different cable or line diameters can be provided in each case, as required.

Figure 13D:
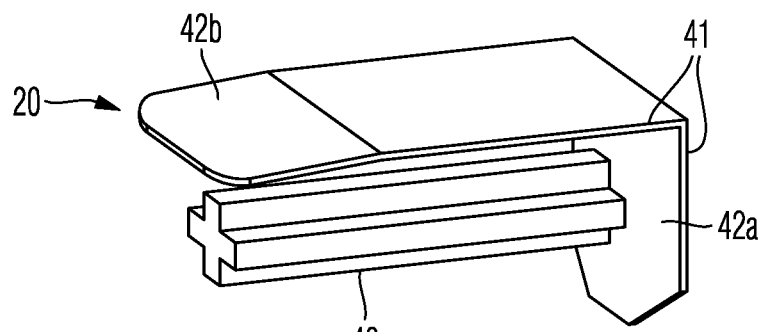
FIG. 13D shows a securing part for the mounting device according to the fifth embodiment.
Figure 14:
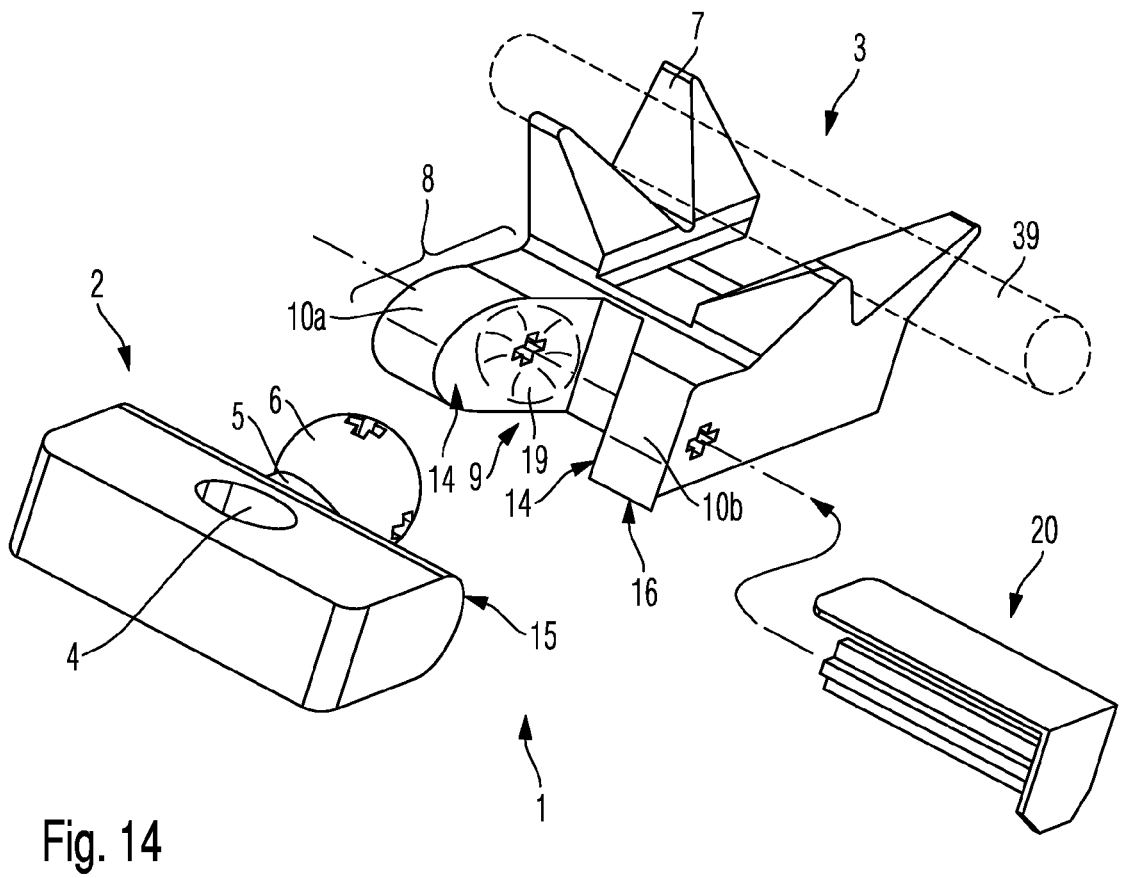
FIG. 14 is an exploded view of the mounting device according to the fifth embodiment, a cable also being indicated.

As shown by FIG. 14, to form the mounting device 1 according to the fifth embodiment, the ball joint head 6 of the attachment part 2 is received in the slot-like recess 9, the ball joint head 6 resting in portions on the surfaces of the depressions 19. In order to lock the two parts 2 and 3 in a selected position relative to one another, a securing part 20 shown in detail in FIG. 13D is provided. The securing part 20 of FIG. 13D differs from the securing part 20, as described above for example with regard to FIG. 2, in that it is not the entire securing part 20, but a portion, configured as a pin 43, which can be introduced into a passage opening 11 in the receiving part 3 and into one of a plurality of passage openings 18 in the ball joint head 6.

The pin 43 has along its longitudinal direction a substantially constant cross section which, in FIG. 13D, is substantially cruciform with limbs of substantially the same length. Similarly to the description with regard to the embodiment of FIG. 2, the cross-sectional shape of the pin 43 corresponds to the shape of the passage openings 11 and 18.

In the case of the securing part 20 of FIG. 13D, the pin 43 projects from an L-shaped wall 41. The L-shaped wall 41 has a first wall portion 42a and a second wall portion 42b. The first wall portion 42a extends substantially vertically to a longitudinal axis of the pin 43 and is connected to the pin 43. The second wall portion 42b extends substantially parallel to the pin 43.

Figure 15:
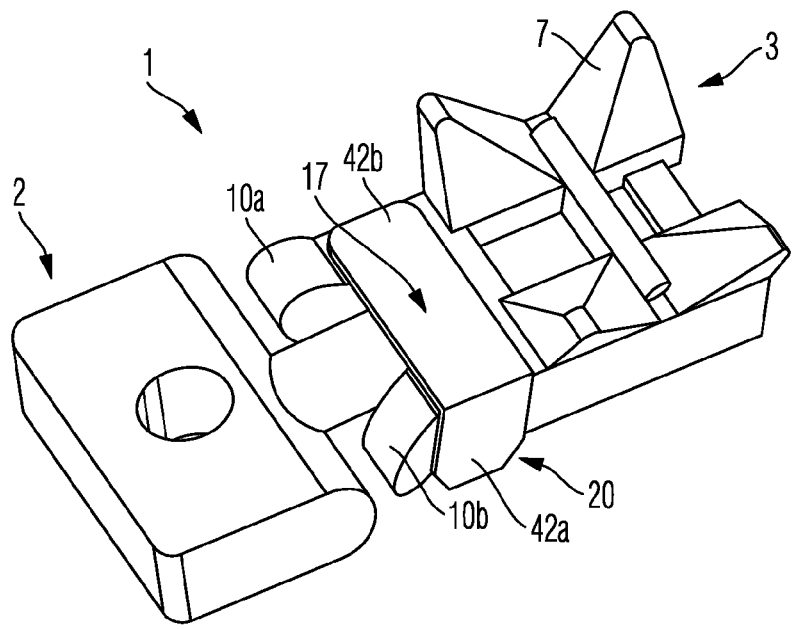
FIG. 15 is a perspective view from above of the mounting device according to the fifth embodiment in an assembled state.

Furthermore, the L-shaped wall 41 with the first and second wall portions 42a and 42b can be accessed by a fitter when the pin 43 has been introduced into the passage openings 11 and 18, see FIG. 15. In particular, the L-shaped wall 41 of the securing part 20 with the first and second wall portions 42a and 42b facilitates the handling of the securing part 20.

Figure 16A:
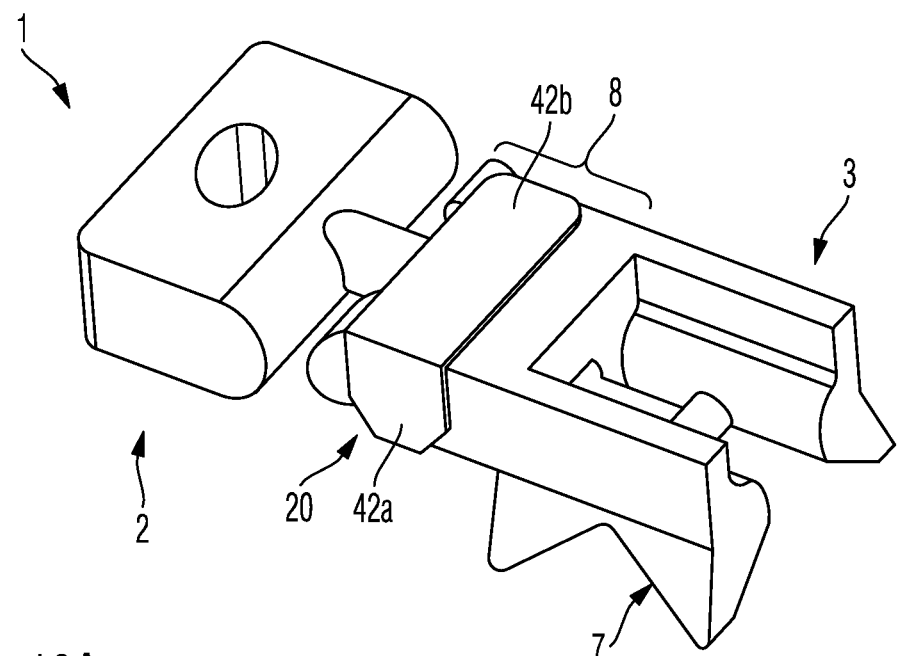
FIG. 16A is a perspective view from above of the mounting device according to the fifth embodiment in a different assembled state.
Figure 16B:
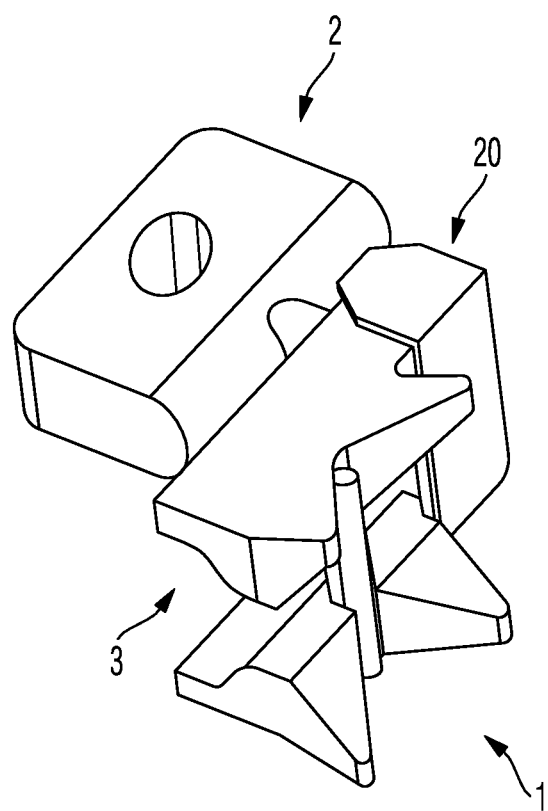
FIG. 16B shows a further possible state of use of the mounting device according to the fifth embodiment.
Figure 16C:
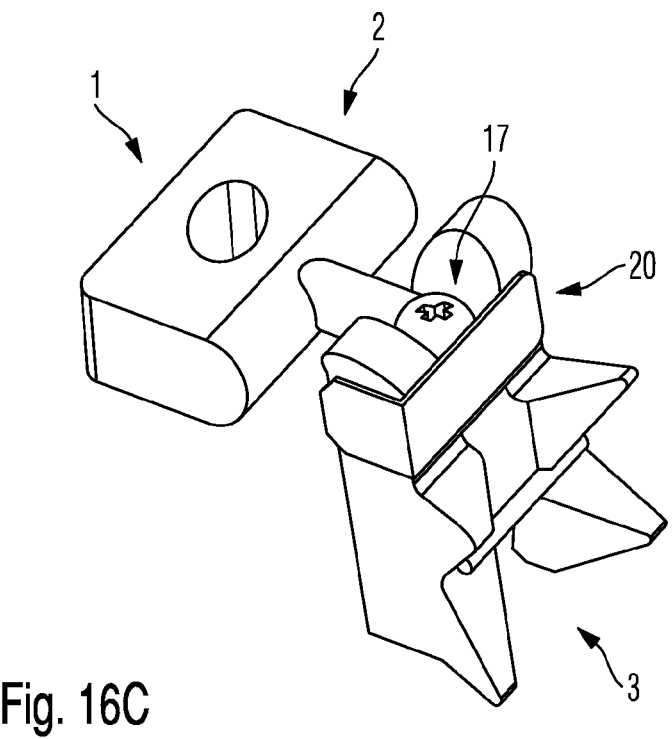
FIG. 16C shows another exemplary state of use of the mounting device of the fifth embodiment.

FIG. 16A shows an assembled state of the mounting device 1 according to the fifth embodiment, in which the second wall portion 42b of the securing part 20 comes to be located on a side, remote from the V-shaped seat 7, of the plate-shaped portion 8 of the receiving part 3. By way of example, FIGS. 16B and 16C show further possible spatial positions in which the receiving part 3 and the attachment part 2 in the fifth embodiment can be locked relative to one another by the securing part 20.

Figure 17:
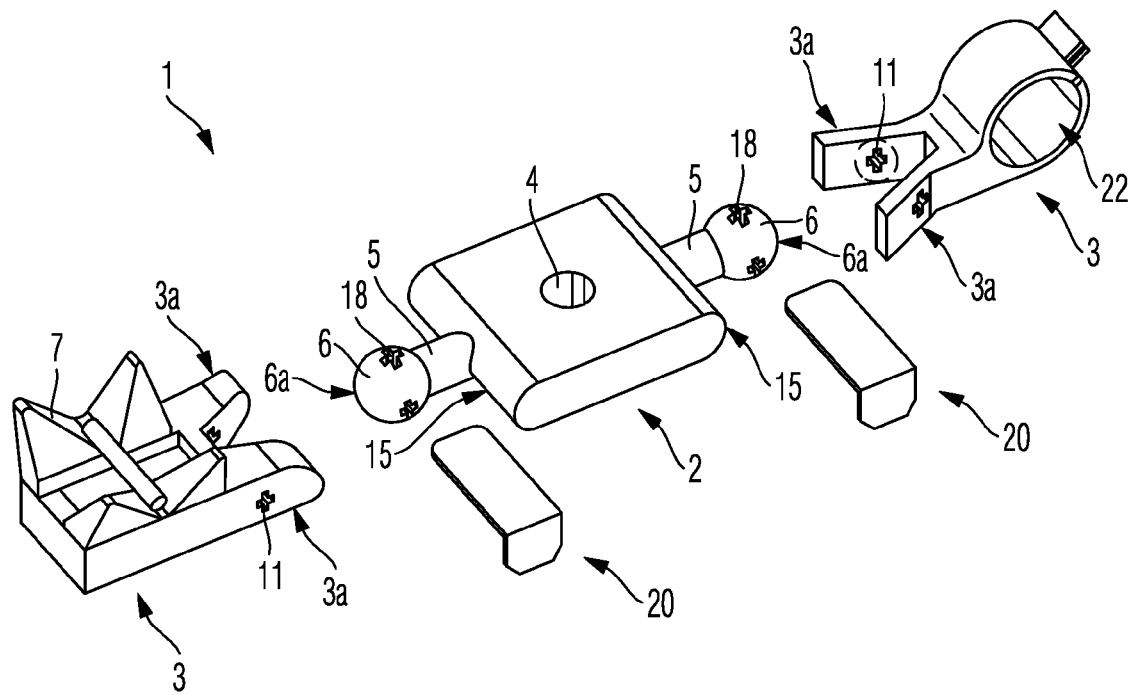
FIG. 17 is an exploded view of a mounting device according to a sixth embodiment of the invention.
Figure 18:
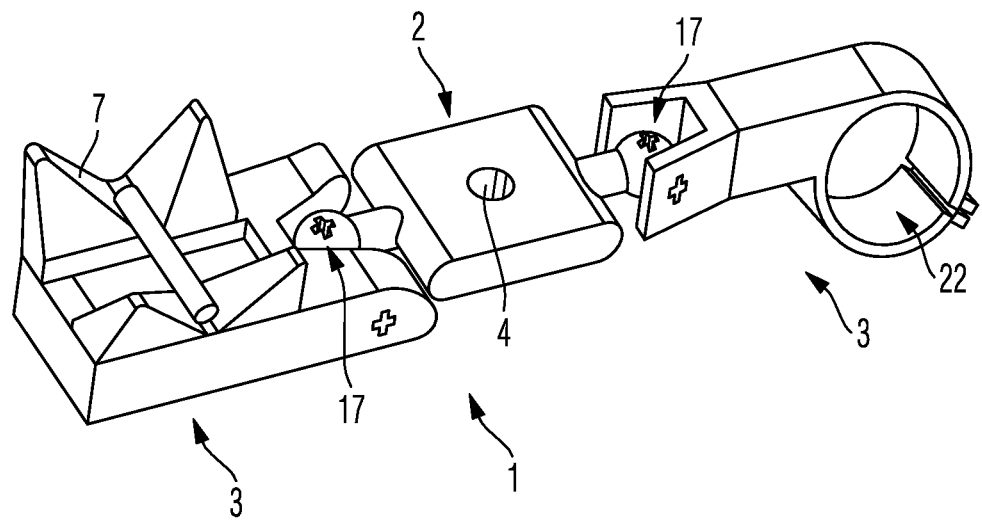
FIG. 18 shows the mounting device of FIG. 17 in a possible assembled state of use.
Figure 19:
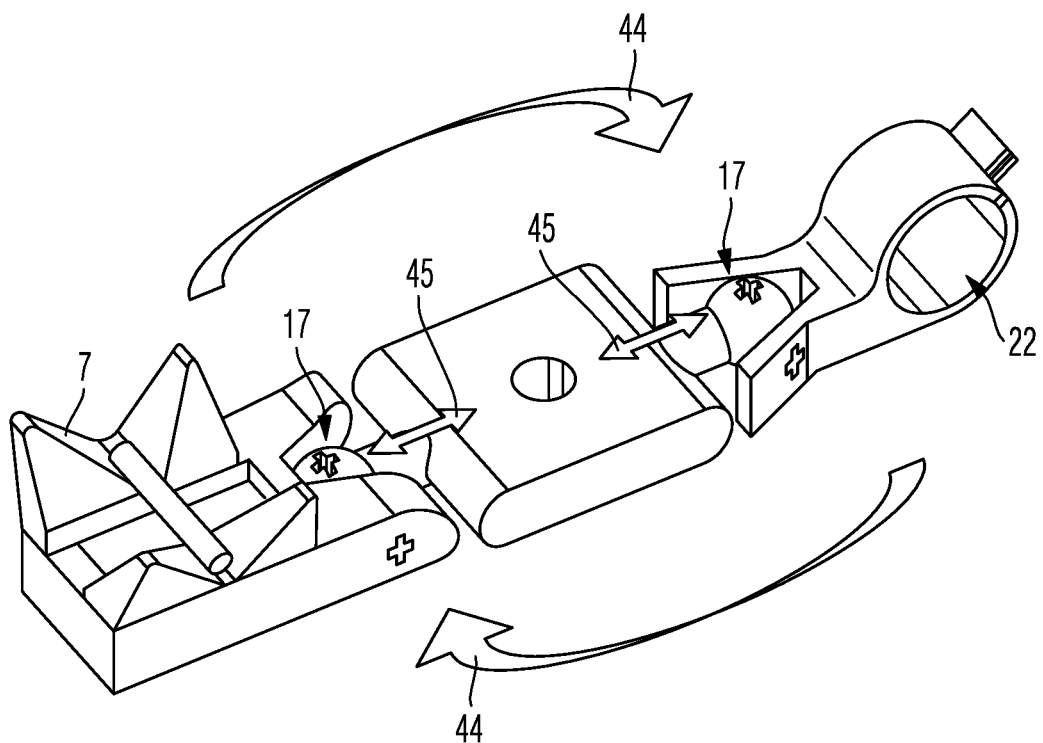
FIG. 19 shows the mounting device according to FIG. 17 in a further possible state of use, a few replacement possibilities also being schematically indicated.

The sixth embodiment of FIG. 17-19 is a variant of the fifth embodiment. In this variant, a respective extension 5 extends from opposite rounded end faces 15 of the attachment part 2 on opposite sides away from the attachment part 2. In this way, two receiving parts 3 can be coupled with the attachment part 2 in the manner described with regard to the fifth embodiment. Also in the embodiment of FIG. 17, the receiving parts 3 are advantageously coupled with the attachment part 2 in a releasable manner, as a result of which, one of a selection of different receiving parts 3 can be coupled with the attachment part 2 by means of each of the ball joint heads 6 of the attachment part 2. In this embodiment as well, the receiving parts 3 can be replaced as desired. In FIG. 19, attachment and removal of the receiving parts 3 to and from the attachment part 2 is indicated by way of example by arrows 45, and the exchange of the two receiving parts 3 is indicated by way of example by arrows 44. It is understood that two identical receiving parts 3 can naturally also be used on the attachment part 2 of the mounting device 1 according to the sixth embodiment. Reference can be made to the illustrations of FIGS. 7B, 7C and 7D and to the associated description concerning the adjustability of the mounting device 1 according to the sixth embodiment.

Although the present invention has been described above in a comprehensive manner on the basis of preferred embodiments, it is not restricted thereto, but can be modified in many different ways.

Firstly, it is conceivable to provide the receiving part, instead of the attachment part, with the extension which supports the ball joint head.

Furthermore, it is possible, for example, to provide the attachment part with more than two extensions, on the end of which a respective ball joint head is located. Alternatively, the attachment part could also have more than two slot-like recesses.

Although the present invention is particularly well suited to mounting electric cables in modern commercial aircraft, it can be applied to all possible aircraft or spacecraft and can also be used to mount other cables, such as fibre optic cables or the like on structural components. The invention can also be useful for mounting fluid-conducting lines, with a suitable choice of dimensions for the mounting device.

It is also possible to supply the part, provided with the slot-like recess, not only with one, but with a plurality of passage openings extending at an angle to one another to further increase the number of possible positions in which the respective ball joint head can be locked positively relative to the recess.

In addition, it is conceivable to provide the receiving part of the mounting device according to the invention with an attachment which can be attached or clipped onto the receiving part and is thus replaceable and which, for its part, has the seat for the cable.

The invention relates to a mounting device for mounting a cable or line on a structural component of an aircraft or spacecraft. The mounting device comprises at least two parts, one of these parts being configured as an attachment part and being provided to be attached to the structural component. The other part is configured as a receiving part and is provided to receive a portion of the cable or line. The two parts can be coupled together by at least a first ball-and-socket joint. This coupling is configured such that the two parts can be brought into a plurality of spatial positions relative to one another. The invention also provides an aircraft or spacecraft, in particular an aircraft, which has a structural component and a cable or a line which is mounted on the structural component by means of a mounting device of this type.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A mounting device for mounting a cable or a line on a structural component of an aircraft or spacecraft, comprising at least two parts, of which
    one part is configured as an attachment part and is provided to be attached to the structural component, wherein the attachment part is configured substantially in the manner of a plate having an attachment opening for attachment to the structural component, and
    the other part is configured as a receiving part and is provided to receive a portion of the cable or of the line,
    wherein the one part and the other part can be coupled by means of at least a first ball-and-socket joint such that the two parts can be brought into a plurality of spatial positions relative to one another, wherein the attachment part is configured with an extension which has an end portion configured as a ball joint head, and wherein the receiving part has a slot-like recess in which the ball joint head can be received at least in portions such that the ball joint head, in cooperation with the recess, forms the first ball-and-socket joint, wherein the receiving part is rotatable relative to the attachment part by means of the ball-and-socket joint engaging the slot-like recess.

2. The mounting device according to claim 1, wherein the coupling of the two parts by means of the first ball-and-socket joint is configured to be releasable for a replacement of one of the two parts.

3. A mounting device for mounting a cable or a line on a structural component of an aircraft or spacecraft, comprising at least two parts, of which
    one part is configured as an attachment part and is provided to be attached to the structural component, and
    the other part is configured as a receiving part and is provided to receive a portion of the cable or of the line,
    wherein the one part and the other part can be coupled by means of at least a first ball-and-socket joint such that the two parts can be brought into a plurality of spatial positions relative to one another, wherein the attachment part is configured with an extension which has an end portion configured as a ball joint head, and wherein the receiving part has a slot-like recess in which the ball joint head can be received at least in portions such that the ball joint head is rotatable in the recess and, in cooperation with the recess, forms the first ball-and-socket joint, wherein the ball joint head is provided with one or more passage openings, in that the second part is provided with at least one passage opening which extends from an outer side of the second part to a surface of the recess facing the ball joint head received in the recess, and in that a securing part is provided which, in one or more of the plurality of spatial positions, can be introduced at least in portions into the passage opening in the second part and into the one passage opening or into one of the plurality of passage openings in the ball joint head such that after introduction, the ball joint head is locked positively with respect to the second part.

4. The mounting device according to claim 1, wherein the second part is provided with a passage opening which extends from an outer side of the second part to a surface of the recess facing the ball joint head received in the recess, and has an internal thread for screwing in a screw or a headless screw.

5. The mounting device according to claim 1, wherein the mounting device has a connecting part which can be coupled with a first part of the two parts by means of the first ball-and-socket joint and can be coupled with a second part of the two parts by means of a second ball-and-socket joint.

6. The mounting device according to claim 5, wherein each of the two parts can be locked relative to the connecting part in one or more of the plurality of spatial positions.

7. The mounting device according to claim 5, wherein the connecting part has at least two end portions which are configured in each case as a ball joint head, and in that the first part and the second part each have a slot-like recess, it being possible for one of the ball joint heads of the connecting part to be received in each of the recesses such that it can be rotated in the recess, and in that a first of the ball joint heads forms the first ball-and-socket joint in cooperation with the recess in the first part and a second of the ball joint heads forms the second ball-and-socket joint in cooperation with the recess in the second part.

8. The mounting device according to claim 7, wherein each of the ball joint heads is provided with one or more passage openings, in that the first part and the second part are each provided with at least one passage opening which extends from an outer side of the part to a surface of the recess facing the ball joint head received in the recess in the part, and in that at least two securing parts are provided, it being possible, in one or more of the plurality of spatial positions, for a first of the securing parts to be introduced at least in portions into the passage opening in the first part and into the one passage opening or into one of the plurality of passage openings in the ball joint head received in the recess in the first part and for a second of the securing parts to be introduced at least in portions into the passage opening in the second part and into the one passage opening or into one of the plurality of passage openings in the ball joint head received in the recess in the second part, such that after the two securing parts have been introduced, the connecting part is locked positively relative to the first part and to the second part.

9. The mounting device according to claim 7, wherein the first part and the second part are each provided with at least one passage opening which extends from an outer side of the part to a surface of the recess facing the ball joint head received in the recess in the part and which has an internal thread for screwing in a screw or a headless screw.

10. The mounting device according to claim 3, wherein the one passage opening or the plurality of passage openings in the ball joint head or in one or both of the two ball joint heads runs substantially through the centre of a spherical segment-shaped superficial portion of the respective ball joint head.

11. The mounting device according to claim 3, wherein the ball joint head or one or both of the two ball joint heads has in each case at least two passage openings which intersect one another substantially at a right angle.

12. The mounting device according to claim 3, wherein the passage opening or the plurality of passage openings in the ball joint head or in one or both of the two ball joint heads and in the part or in the parts has in each case a polygonal cross-sectional shape, preferably a cruciform cross-sectional shape, and in that the securing part or the securing parts respectively has/have at least in portions a polygonal cross-sectional shape, which substantially corresponds to the cross-sectional shape of the passage openings.

13. The mounting device according to claim 1, wherein the mounting device has a further part which is configured as a receiving part and which can be coupled with the part configured as the attachment part by means of a further first ball-and-socket joint or by means of a further connecting part and a further first ball-and-socket joint and a further second ball-and-socket joint.

14. An aircraft or spacecraft having a structural component on which a cable or a line is mounted by means of a mounting device, comprising at least two parts, of which
one part is configured as an attachment part and is provided to be attached to the structural component, wherein the attachment part is configured substantially in the manner of a plate having an attachment opening for attachment to the structural component, and
the other part is configured as a receiving part and is provided to receive a portion of the cable or of the line,
wherein the one part and the other part can be coupled by means of at least a first ball-and-socket joint such that the two parts can be brought into a plurality of spatial positions relative to one another, wherein the attachment part is configured with an extension which has an end portion configured as a ball joint head, and wherein the receiving part has a slot-like recess in which the ball joint head can be received at least in portions such that the ball joint head, in cooperation with the recess, forms the first ball-and-socket joint, wherein the receiving part is rotatable relative to the attachment part by means of the ball-and-socket joint engaging the slot-like recess.

15. The mounting device according to claim 8, wherein the one passage opening or the plurality of passage openings in the ball joint head or in one or both of the two ball joint heads runs substantially through the centre of a spherical segment-shaped superficial portion of the respective ball joint head.

16. The mounting device according to claim 8, wherein the ball joint head or one or both of the two ball joint heads has in each case at least two passage openings which intersect one another substantially at a right angle.

17. The mounting device according to claim 8, wherein the passage opening or the plurality of passage openings in the ball joint head or in one or both of the two ball joint heads and in the part or in the parts has in each case a polygonal cross-sectional shape, preferably a cruciform cross-sectional shape, and in that the securing part or the securing parts respectively has/have at least in portions a polygonal cross-sectional shape, preferably a cruciform cross-sectional shape which substantially corresponds to the cross-sectional shape of the passage openings.

18. The mounting device according to claim 1, wherein the two parts can be locked relative to one another in one or more of the plurality of spatial positions.

* * * * *